(12) United States Patent
Makowski et al.

(10) Patent No.: US 12,298,717 B2
(45) Date of Patent: May 13, 2025

(54) METHODS OF RECORDING AND REPRODUCING HOLOGRAMS

(71) Applicants: Politechnika Warszawska, Warsaw (PL); Uniwersytet w Bialymstoku, Bialystok (PL)

(72) Inventors: Michal Makowski, Warsaw (PL); Maciej Sypek, Warsaw (PL); Jaroslaw Bomba, Jozefow (PL); Andrzej Stupakiewicz, Bialystok (PL)

(73) Assignees: Politechnika Warszawska, Warsaw (PL); Uniwersytet w Bialymstoku, Bialystok (PL)

( * ) Notice: Subject to any disclaimer, the term of this patent is extended or adjusted under 35 U.S.C. 154(b) by 400 days.

(21) Appl. No.: 17/973,972

(22) Filed: Oct. 26, 2022

(65) Prior Publication Data

US 2023/0131927 A1    Apr. 27, 2023

(30) Foreign Application Priority Data

Oct. 27, 2021   (PL) ........................................ 439338

(51) Int. Cl.
  *G03H 1/10*   (2006.01)
  *G03H 1/22*   (2006.01)
(52) U.S. Cl.
  CPC ............. *G03H 1/10* (2013.01); *G03H 1/2205* (2013.01); *G03H 2001/221* (2013.01); *G03H 2223/24* (2013.01)
(58) Field of Classification Search
  CPC .. G03H 1/10; G03H 1/2205; G03H 2001/221; G03H 2223/24; G03H 1/00;
(Continued)

(56) References Cited

U.S. PATENT DOCUMENTS

2004/0009406 A1*   1/2004   Hesselink ............ G11B 7/0065
2004/0027968 A1*   2/2004   Horimai ............. G11B 7/24044
(Continued)

FOREIGN PATENT DOCUMENTS

JP       2013218140 A   * 10/2013

OTHER PUBLICATIONS

Joanna Starobrat, Antoni Frej, Jan Bolek, Rafal Jan Trybus, Andrzej Stupakiewicz, and Michal Makowski—Photo-magnetic recording of randomized holographic diffraction patterns in a transparent medium—vol. 45, No. 18 / Sep. 15, 2020 / Optics Letters.
(Continued)

*Primary Examiner* — Arnel C Lavarias
(74) *Attorney, Agent, or Firm* — Ralph E. Jocke; WALKER & JOCKE

(57) ABSTRACT

Methods for recording and reproducing holograms include recording a hologram in a thresholded opto-magnetic medium by producing a collimated recording beam with a pulsed laser. The intensity of the recording beam is selectively modulated by passage through a modulator and spatially shaped by passage through a shaping element. The recording beam is made convergent by passage through an aspheric lens and is deflected bidirectionally with a MEMS mirror that is in operative connection with the modulator. Multiple disposed locations on a surface of the medium are exposed to a constriction of the convergent shaped beam causing a change in the medium. The hologram is reconstructed by illuminating the medium with a collimated laser beam and focusing light with a lens onto a detection matrix.

24 Claims, 18 Drawing Sheets

(58) Field of Classification Search
CPC .............. G03H 1/0005; G03H 1/02; G03H 2001/0216; G03H 2001/0224; G03H 2001/0228; G03H 1/024; G03H 1/0248; G03H 2001/026; G03H 2001/0268; G03H 1/04; G03H 1/0402; G03H 2001/0413; G03H 2001/0415; G03H 2001/0432; G03H 1/0443; G03H 1/0493; G03H 1/08; G03H 1/0841; G03H 2001/0858; G03H 1/0866; G03H 1/0891; G03H 1/22; G03H 1/2202; G03H 2223/17; G03H 2260/00; G03H 2260/30
USPC ...... 359/10, 1, 3, 4, 5, 9, 13, 11, 21, 22, 25, 359/27, 28, 29, 30, 32, 33, 35; 430/1, 2
See application file for complete search history.

(56) References Cited

U.S. PATENT DOCUMENTS

| | | | |
|---|---|---|---|
| 2004/0036948 A1* | 2/2004 | Inoue | G02F 1/09 359/291 |
| 2014/0253986 A1* | 9/2014 | Inoue | G03H 1/02 359/9 |

OTHER PUBLICATIONS

B. R. Brown and A. W. Lohmann—Complex Spatial Filtering with Binary Masks—Jun. 1966 / vol. 5, No. 6 / Applied Optics.
A. Stupakiewicz, K. Szerenos, D. Afanasiev, A. Kirilyuk & A. V. Kimel—Ultrafast nonthermal photo-magnetic recording in a transparent medium—doi:10.1038/nature20807, Feb. 2, 2017.

* cited by examiner

METHODS OF RECORDING AND REPRODUCING HOLOGRAMS

TECHNICAL FIELD

The subject of the exemplary arrangements are methods of recording holograms in an opto-magnetic medium. Exemplary arrangements further include methods for reproducing holograms. Some exemplary arrangements are suitable for use in near-eye systems of virtual and augmented reality displays.

DISCUSSION

Optical holography is one of the most promising techniques for obtaining spatial images. Recording a hologram may include capturing or recording an interference image produced by two beams of coherent light. The first beam carries information about the shape of an illuminated object (the beam of interest) and the second beam which is used as reference (the reference beam). The image recorded on an optical medium contains information about both the amplitude and the phase of the beam coming from the object relative to the reference beam. The recorded image allows a three-dimensional holographic image to be visually observed in a reconstruction process when the recorded image is illuminated by coherent light corresponding to the reference beam.

As the work on developing and increasing the efficiency and accuracy of three-dimensional images has progressed, it is become possible to produce a holographic image without reflecting coherent light from an actual object. Instead it is possible to produce a computer generated diffraction pattern for an object that may not physically exist, which is then generated on a planar display device. As implemented in this way, the integration of the spatial imaging process with other—in this case, more accessible—advanced optical functions allows for the classical holography to be gradually supplemented or supplanted by computer generated holography.

The ability to image physical objects and/or to produce computer generated images or objects with virtually no objectwise limitations, as well as the much higher image recording accuracy and efficiency, makes computer generated holography a useful technology. It is often particularly useful in the near-eye systems of virtual and augmented reality displays. Holograms captured based on computer provided diffraction patterns may be displayed on liquid crystal spatial light modulators which—when illuminated by a beam of quasi-monochromatic light—reproduce three-dimensional images containing depth and spatial perspective that is visible to the eye.

However, computer holography, the implementation of which is based on the use of spatial light modulators, may have limitations in terms of efficiency and speed. One limitation is that when a regular pixel matrix is present in the process, the formation of duplicates of the image may interfere with the legibility of the reproduced image. Another limitation may be that the image recording time, which is limited by the response time of the liquid crystal material itself, is relatively slow at the microsecond level. Another potential limitation is the requirement for electrical contacts that address each pixel of the spatial modulator separately. This requires complicated and potentially problematic pixel addressing and limitations in the transfer rate for information of high repetitiveness. There is also a potential drawback of the lack of memory in the liquid crystal material. This may require energy-consuming, periodic refreshing of the orientation state of the long axes of liquid crystal molecules in each pixel of the modulator. Another potential drawback may be a lack of complex, i.e. amplitude-phase, modulation. This may result in increased noise as well as the need for use of complicated algorithms and components for circumventing this drawback.

As part of the work on enhancing holographic imaging techniques, scientific research and available publications in the field discuss optical devices and components and the use thereof, in particular the spatial modulators, as well as the parameters of the illuminating beam.

By way of example, a method of modulating light in a transparent medium on the basis of the Faraday effect is discussed in U.S. Ser. No. 10/747,032 B1 and US20110149018 A1, the disclosures of each of which is incorporated herein by reference in its entirety, as well as WO2005/076714 A2. These publications discuss how the magnetic field used to implement the Faraday effect is induced by the flow of electric current through a coil.

Moreover, a method of recording phase transmittances in an optically transparent medium as a result of thermally induced permanent and irreversible phase transitions of a material is discussed in US20030049543 A1, the disclosure of which is incorporated herein by reference in its entirety.

U.S. Pat. No. 6,721,076 B2 which is also incorporated herein by reference it its entirety discusses a method of recording holographic interference gratings in a photosensitive reflective medium on a point-by-point basis.

U.S. Pat. No. 8,164,988 B2, U.S. Pat. No. 9,280,996 B2 and US20140368303 A1, the disclosures of each of which are incorporated herein by reference, each discuss media and methods for an all-optical switching of magnetization by reorienting the magnetization in the domains under the influence of ultra-short pulses of light for thermally recording single magnetic bits.

Moreover, a photomagnetic medium is discussed in U.S. Ser. No. 10/037,777 B1 the disclosure of which is incorporated herein by reference. The medium enables single magnetic domains to be recorded non-thermally under the influence of ultra-short pulses of light from a femtosecond laser.

Despite all of the prior developments methods for recording and reproducing holograms may benefit from improvements.

SUMMARY

Exemplary methods described herein enable energy-efficient remote recording of high-quality complex holograms in a transparent medium that has a memory and a high refresh rate, without having to use electrodes and external electric or magnetic fields. Such exemplary methods further provide for reproduction of the hologram from the medium in which the recording has been made.

Exemplary methods provide a method of recording computer generated holograms with a high diffraction efficiency, increased contrast and a reduced noise level in an optically transparent medium, while enabling an all-optical switching of the magnetic domains of the medium with the ability to randomize their positions.

In an exemplary arrangement the method is implemented using a thresholded opto-magnetic medium, which when used herein refers to a material in which light switches the magnetization locally, without additional factors, such as a magnetic field or voltage or electric current. Consequently, the optical switching of the orientation of the magnetization of the domains in the medium causes a change in the rotary polarization of the light passing through the changed portion of the medium on the basis of the Faraday effect. A medium and method for optical switching of the magnetic domains are described in a paper by A. Stupakiewicz, K. Szerenos, D. Afanasiev, A. Kirilyuk, and A. Kimel, Nature 542, 71 (2017) which is incorporated herein by reference. Moreover, a publication by J. Starobrat, A. Frej, J. Bolek, R. Trybus, A. Stupakiewicz, and M. Makowski, "Photo-magnetic recording of randomized holographic diffraction patterns in a transparent medium", Opt. Lett. 45, 5177-5180 (2020) which is also incorporated herein by reference, discusses a method of contactlessly recording diffraction patterns corresponding to holograms in an opto-magnetic medium, and a method of reconstructing (reproducing) the holographic recording through amplitude modulation of an illuminating polarized laser beam which illuminates the medium in which recording has been made.

In accordance with an exemplary arrangement, the method of capturing holograms in a thresholded opto-magnetic medium includes the steps of recording a hologram in an opto-magnetic medium and reconstructing the same through illumination of the medium. In the steps of recording, a collimated recording beam from a pulsed laser is directed towards an aspheric lens. The lens causes the recording beam to be in the form of a spherical convergent beam. The convergent recording beam is then deflected by a micromechanical MEMS-type mirror and focused on the surface of the thresholded opto-magnetic medium. In this manner the surface of the medium is exposed to the constricted form of the beam due to the convergent configuration of the beam. Exposing the surface of the opto-magnetic medium to the beam causes a change in, i.e. a reversal of, the direction of the magnetization vector in the magnetic domains at locations in the medium in which the energy of the recording beam in contact with the medium exceeds the threshold of the magnetization reaction in the magnetic domains. In a subsequent process of reconstructing, a collimated laser reconstructing beam illuminates the opto-magnetic medium that has been changed by the recording beam. Then, as a result of diffraction on the surface of the opto-magnetic medium, the light from the illuminated medium deflects to form a beam which is then focused on the surface of a detection matrix by the lens of a camera or similar device to form an observation plane. A useful aspect of some exemplary arrangements is that in the steps associated with recording, the intensity of the recording beam is modulated by means of a modulator. The modulator is in operative connection with to the MEMS mirror. The MEMS mirror is caused to deflect bidirectionally, such that an intensity-modulated recording beam focused to a constricted form by the aspheric lens, results in multiple acts of exposure in different locations of the opto-magnetic medium. Moreover, in exemplary arrangements the recording beam intensity-modulated by the modulator, is spatially shaped by passing through a shaping element. In exemplary arrangements the recording beam has an asymmetrical cross-section at the point at which the constricted and spatially shaped recording beam contacts the surface of the opto-magnetic medium. This point of exposure on the surface of the medium is alternatively referred to herein as a constriction, gaussian waist or the point of the constriction herein.

In exemplary arrangements the spatially shaping element comprises a diapositive plate with symmetrically shaded areas and a central, unidirectionally extending transparent strip of a uniform width through which the recording beam propagates.

In exemplary arrangements the transparent strip extends horizontally in the shaping element.

In exemplary arrangements as a result of the intensity modulation by the modulator, the intensity of the recording beam focused on the surface of the opto-magnetic medium is selectively decreased.

In exemplary arrangements the modulator and the MEMS mirror are operatively coupled to each other, and selectively controlled by a computer.

In addition, in exemplary arrangements during the reconstructing steps the laser reconstructing beam comprises a coherent polarized beam.

In exemplary arrangements in the reconstruction steps, before illuminating the opto-magnetic medium that has been subject to change in the recording process, the reconstructing beam passes through a polarizer. Further in exemplary arrangements before passing through a lens or entering the camera, the beam that has emanated from the illuminated medium passes through another polarizer which comprises an analyzer with a polarization axis crossed with respect to the polarization axis of the polarizer such that it is perpendicular therewith.

In exemplary arrangements the pulsed beam which serves as the recording beam is generated by a femtosecond laser, and the reconstructing beam is generated by a laser with a wavelength in the visible range.

In methods of some exemplary arrangements the complex amplitude-phase modulation and the quantization of modulation, allows for the recording of holograms with an improved diffraction efficiency and a high quality of the reproduced images through increased contrast thereof and, simultaneously, a reduced noise level. The holographic images obtained through execution of the exemplary methods also exhibit improved brightness and a lower visibility of the duplicate images resulting from the reconstruction steps. In addition, before, during and after the hologram is recorded by changing the magnetic domains due to the exposure to the recording beam, the opto-magnetic medium retains the transparency for light. Such a feature is desirable in the context of potential applications in head-up displays. In the exemplary method the recording of the diffraction pattern, divided into changed optic properties in disposed elementary cells, in the opto-magnetic medium, causes during reconstruction the formation of a carrier frequency which makes the holographic image reproduce off-axis, i.e. at an angle relative to the initial direction of propagation of the light beam that illuminates the medium and reproduces the hologram. It is an advantage of exemplary arrangements that the contrast of the recording in the opto-magnetic medium, understood as the magnitude of the Faraday rotations, is small. This aspect of exemplary arrangements may also be beneficial in the context of applications in near-eye head-up displays, where excessive modulation could interfere with vision through the hologram by creating visible diffraction effects against the background of bright light sources.

In carrying out the exemplary methods improvements to the Adolf Lohmann method (B. R. Brown and A. W. Lohmann, "Complex Spatial Filtering with Binary Masks," Appl. Opt. 5, 967-969 (1966)) which is incorporated herein by reference, was adopted for recording the graphical representation of the amplitude and phase of the hologram. The Lohmann method includes defining the shape and position of the recorded holographic patterns in a discrete form. Such discrete recording may provide in the reconstruction process an increased ability to perform complex modulation in terms of the amplitude and phase of the light passing through the opto-magnetic medium that is used in the reproduction. In general, the Lohmann method of representation provides for the plane of the spatial frequencies of the hologram to be divided into square sectors with a width of $\Delta v_x$, $\Delta v_y$, called discretization cells. One discretization cell with a center at the sampling point $v_{xn}=n\Delta v_x$, $v_{ym}=m\Delta v_y$ corresponds to each sample G ($n\Delta v_x$, $m\Delta v_y$). The collection of all square cells forms a sampling grid. In the Lohmann method the value of the amplitude $A_{nm}$ and phase $\varphi_{nm}$ at a given sampling point is mapped in the form of a transparent rectangular aperture against a non-transparent background. The height of the aperture $W_{nm}\Delta v_y$ is proportional to the value of the amplitude $A_{nm}$, while the phase $\varphi_{nm}$ is indicated by the magnitude of the offset $P_{nm}\Delta v_x$ of the center of the aperture relative to the center of the cell. As the hologram recorded via the Lohman method is reproduced, the images appear in various diffraction rows, as in a diffraction grid. This is due to the discrete-binary nature of the structure of the Lohmann hologram.

Computer generated holograms (CGH) with their three-dimensional appearance may provide immersive displays with bi-directional, natural parallax. Updateable 3-D imagery can be achieved with liquid crystal modulators of high-resolution. Large-scale holographic displays based on CGH with moving imagery can be accomplished by rewriting light-diffracting cells at a minimal framerate of 180 Hz, assuming color field sequential operation is to be achieved. To achieve such capabilities, liquid crystal on silicon spatial light modulators (LCoS SLM) may be used to achieve short refresh times in the order of microseconds in the case of ferroelectric LC (liquid crystal). The use of faster data transfer schemes and pixel driving and addressing circuitry may be used to achieve such capabilities. For example the use of multiple SLMs in both coherent and incoherent matrices may provide benefits. Alternatively, photorefractive and photochromic materials may be used to achieve large-surface, ultra-dense, pixel-less writing. However, the longer response times and longer nanosecond pump pulses with higher energy fluences of some arrangements tends to render the holographic images quasistatic. Other approaches to improve the recording and reproduction of holograms may be used.

In exemplary methods variations of the Lohmann method have been developed and implemented, along with other improvements as described in the following Detailed Description.

DETAILED DESCRIPTION

Figure 1:
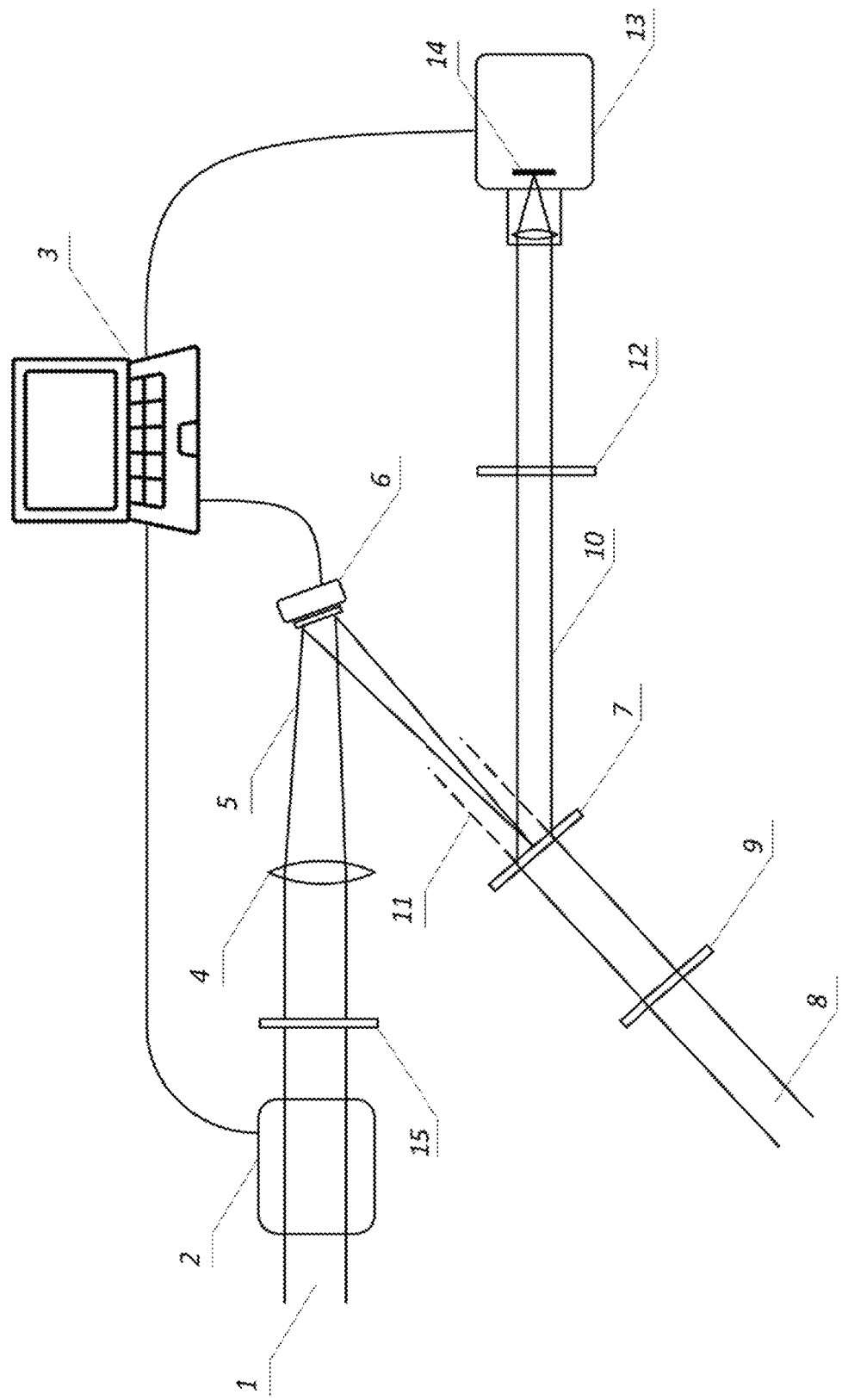
FIG. 1 is a schematic diagram of an exemplary optical system used for recording and reproducing a hologram in an opto-magnetic medium.

Referring now to the drawings and particularly to FIG. 1 there is shown an optical system used in some exemplary methods for recording and reproducing holograms. In exemplary methods the hologram is recorded in and reproduced using a thresholded opto-magnetic medium 7. A collimated recording beam 1 produced by a femtosecond laser is intensity-modulated by passage through a modulator 2. The modulator and the intensity of the modulated recording beam is controlled by a computer 3. The modulated recording beam is then caused to be convergent by passage through an aspheric lens 4 to produce a spherical convergent recording beam 5.

Then in an exemplary method, the course of the modulated convergent recording beam 5 is selectively deflected in two directions (selectivity directed up-down and left-right) onto two disposed locations on a surface plane of the medium 7 by a micromechanical MEMS (Micro Electro-Mechanical Systems)-type mirror 6 controlled by the computer 3. The deflected modulated convergent recording beam 5 reaches a maximum desired convergent beam area of focus (constriction or gaussian waist) at the surface plane of the opto-magnetic medium 7. The exposure to the constriction causes optical switching of the magnetic domains in the medium at exposure locations in which the energy of the constriction to which the medium is exposed exceeds the reaction threshold of the medium (in accordance with the magnetization threshold of the domains). In exemplary arrangements a single pulse from a femtosecond laser with any polarization is sufficient to produce a constriction which causes the optical switching at a given location of exposure of the opto-magnetic medium 7 to the constriction. In an exemplary arrangement a femtosecond laser having a laser light pulse duration in the range of 0.04-10 ps and a pulse energy of the order of 100 µJ, that produces a deflected convergent recording beam constriction having an exposure area on the medium surface on the order of <100 µm$^2$ and having a surface energy density of <100 mJ/cm$^2$ is used to record the hologram. Of course it should be understood that this approach is exemplary and in other arrangements other sizes and energy levels may be used.

As a result of the exemplary arrangement the change in the angle of the MEMS mirror 6 to provide two deflected recording beams, synchronized with the intensity modulation by the modulator 2, results in multiple locations of exposure of the surface plane or opto-magnetic medium 7 to constrictions. This exemplary approach produces a holographic diffraction pattern in the form of a spatial distribution of magnetization in the magnetic domains in areas across the surface plane throughout the volume of the opto-magnetic medium 7. Thus the exemplary recording steps are operative to record the hologram in the areas of the medium that are exposed to the constrictions of the recording beam.

In the process steps of reproducing (reconstructing) the hologram thus recorded, in order to visually observe the hologram corresponding to the recorded diffraction field, a collimated laser reconstructing beam 8 with a wavelength in the visible range is produced. In an exemplary arrangement a collimated laser beam with a wavelength of 635 nm is used. The reconstructing beam 8 is polarized by passing it through a polarizer 9. The polarizer 9 has a first axis of polarization. The opto-magnetic medium 7 in which the opto-magnetic recording is made, is illuminated with the polarized reconstructing beam. In exemplary arrangements polarizer 9 has been shown as a separate component of the system through which the reconstruction beam passes. However, in other exemplary arrangements the reconstructing beam may be produced initially as a polarized beam.

As a result of illuminating the opto-magnetic medium the diffraction of the reconstructing beam 8 on the magnetic domains in the opto-magnetic medium 7, causes the further propagation of light passed through the medium to be deflected from its original course and direction 11 by an angle associated with the density of recording of the diffraction patterns in the opto-magnetic medium 7. This effect results from the fact that holograms recorded according to the Lohmann method, by definition, have a carrier frequency. That is the recorded indicia (domains that have undergone change due to constriction exposure) reconstruct the image at a certain angle relative to the direction of propagation of the light beam which falls on the hologram indicia in order to reproduce the image therefrom. This causes the light beam illuminating the hologram to change its propagation angle.

Figure 7:
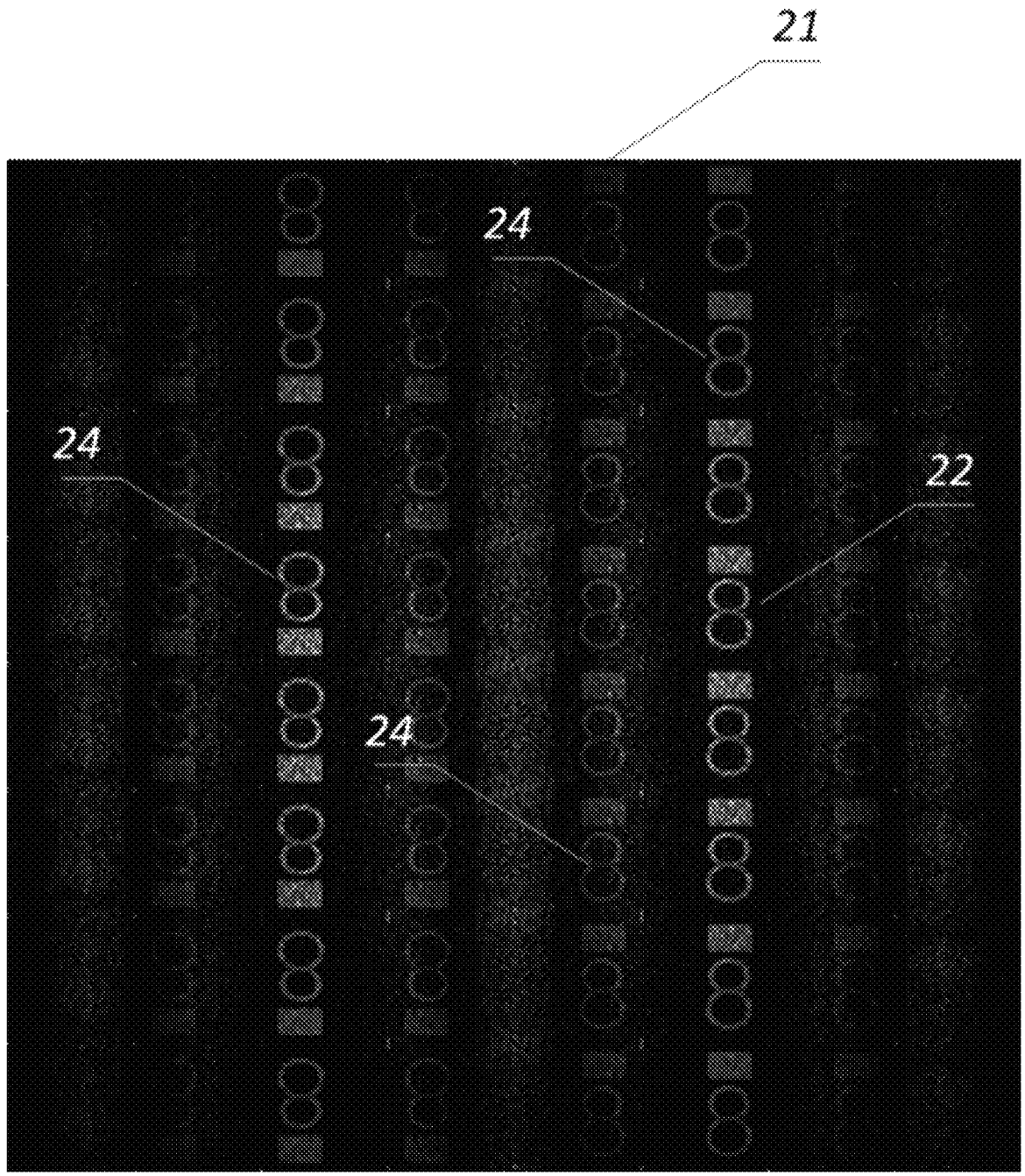
FIG. 7 shows a simulation of reproducing a holographic image from a hologram with a sample size of 64×64, recorded through exposure of the thresholded opto-magnetic medium to an exemplary recording from using a symmetrical spot in accordance with an exemplary method.

In an exemplary arrangement light 10 produced by illumination of the medium by the polarized reconstructing beam 8, runs at the changed angle and is passed through an analyzer 12. The analyzer 12 comprises a polarizer oriented in a crossed configuration with respect to the polarizer 9 (i.e. the polarization axis of analyzer 12 is perpendicular to the polarization axis of the polarizer 9). The light included in the deflected reconstructing beam 10 carries information about the encoded image or spatial scene recorded in the opto-magnetic medium 7. Then, the beam 10 is focused on the surface of a detection matrix 14 by a lens. The lens may be a lens of a camera 13 for example. The detection matrix may include a plurality of photo-sensitive pixel elements that produce signals responsive to light which impinges on each of the elements, such as charge coupled devices (CCD) or other detection devices such as those used in cameras or other devices that are used to capture data corresponding to images. An analysis of the data from the matrix which can be visualized as holographic images 21 thus obtained, is performed by the computer 3. A useful image 22 which is in the first row of images produced from the angled diffracted light from the illuminated medium as well as numerous undesirable duplicate images 24 are visible in the holographic image 21, as detected by the elements of the detection matrix and as represented visually in FIG. 7.

Figure 4:
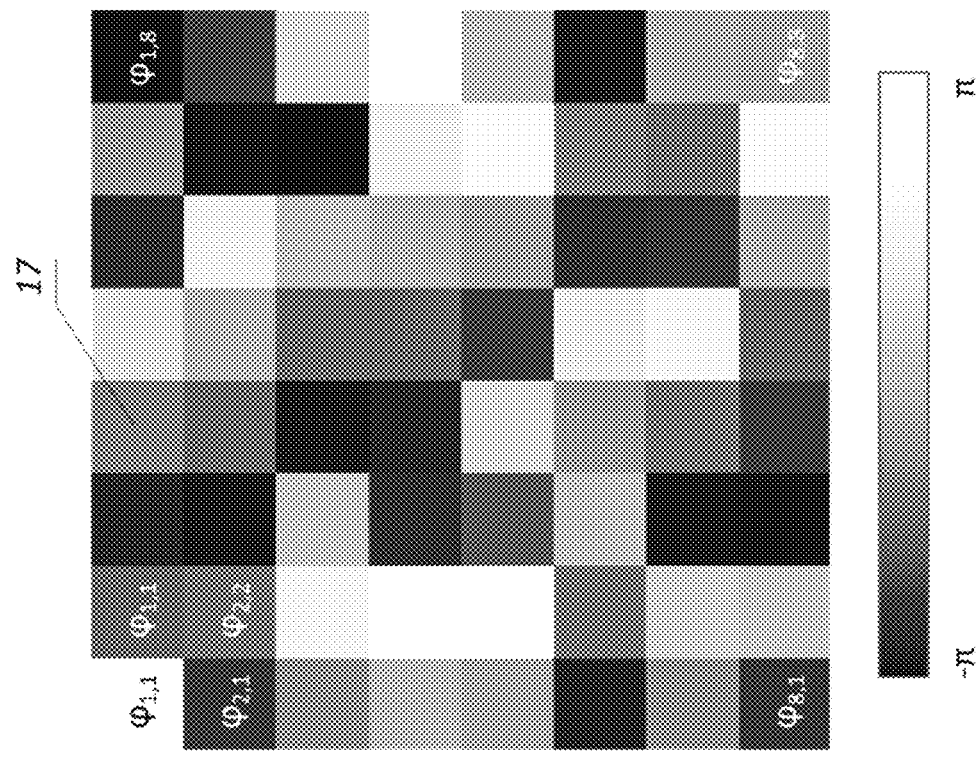
FIG. 4 shows a central fragment of an exemplary computer generated hologram as a set of 8×8=64 complex samples, each of which samples has the value of a) amplitude (A) and b) phase ($\varphi$).
Figure 4:
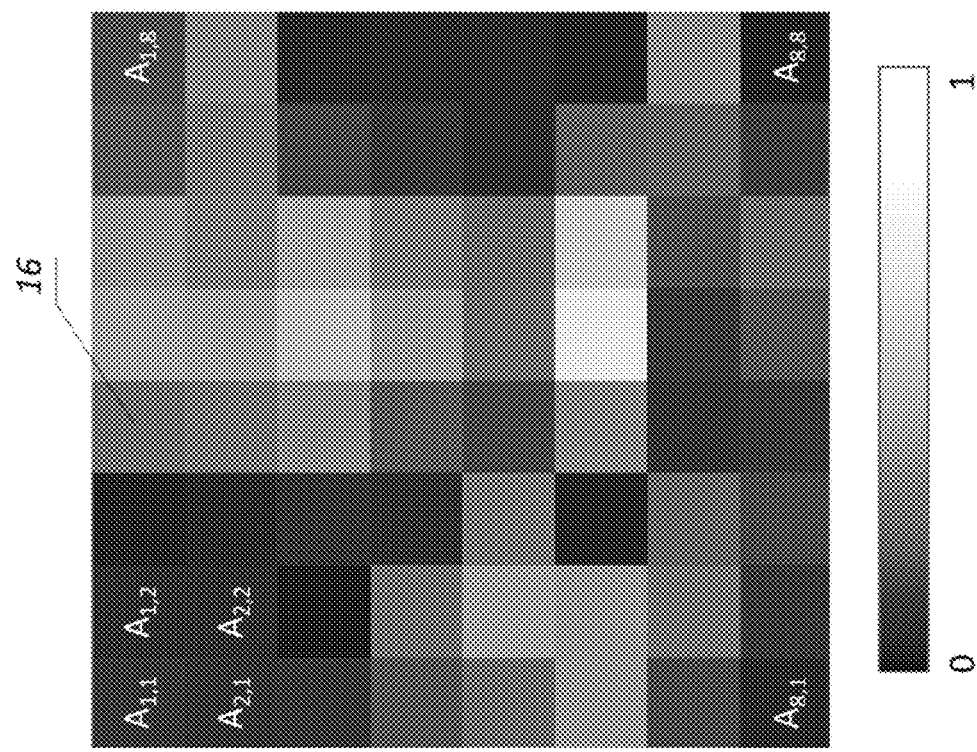
Figure 5:
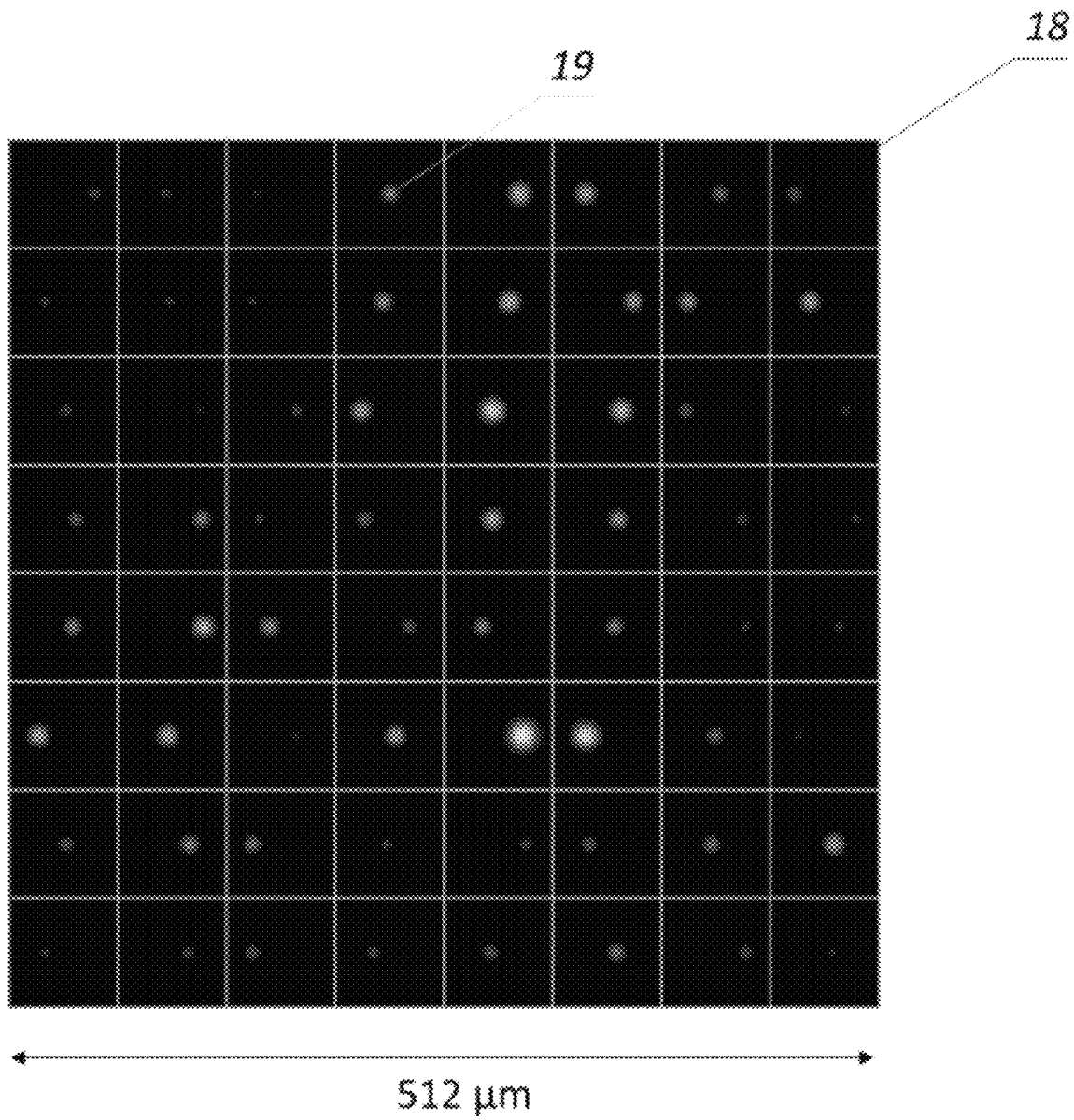
FIG. 5 shows a visualization of the positions and intensities of the constriction beam exposure spots of the recording beam on the surface of the opto-magnetic medium in areas, each of which corresponds to one of the complex samples shown in FIG. 4.
Figure 8:
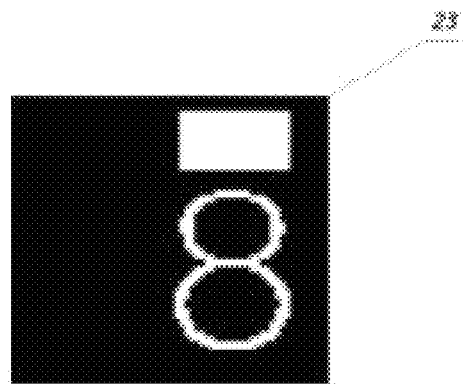
FIG. 8 shows a test input image encoded in the computer generated hologram used in exemplary arrangements.

The shape and position of the holograms recorded in the opto-magnetic medium of the exemplary arrangement are defined in accordance with new and useful variations of the Lohmann method. The data corresponding to computer generated holograms to be recorded in the opto-magnetic medium is computed using the computer 3 by virtue of a discrete Fourier transform of an input image 23 (represented by FIG. 8). The hologram is calculated with a random initial phase distribution and, in accordance with the arrangement depicted in FIG. 4, comprising 64×64 complex samples 16/17, i.e. each including the value of amplitude (A) 16 and the value of phase (φ) 17. A visualization (visual representation) of the positions and intensities of the constriction spots produced by the recording beam 5 impinging on the surface of the opto-magnetic medium 7 in the areas corresponding to the complex samples 16/17 of FIG. 4 is presented in FIG. 5. In an exemplary arrangement a square elementary cell 19 with a size of the order of 64×64 µm corresponds to each hologram sample on a recording surface 18 of the opto-magnetic medium 7. The recording locations of a given spot in the opto-magnetic medium 7 are controlled by appropriately setting the angles for the bidirectionally reflected recording beams as directed onto the disposed locations on the surface of the medium by the MEMS mirror 6. The precise position of the center of the area at the location being switched (the center of the constriction spot being recorded) is determined by the computer in relation to the value of the phase in the corresponding complex sample 17 of the calculated computer hologram. As a result, the light from the reconstruction laser beam, as it propagates through the sample in a given cell, experiences a phase delay proportional to the offset of the center of the recorded constriction spot from the central position within the elementary cell on the recording surface plane 18 of the opto-magnetic medium.

Figure 6:
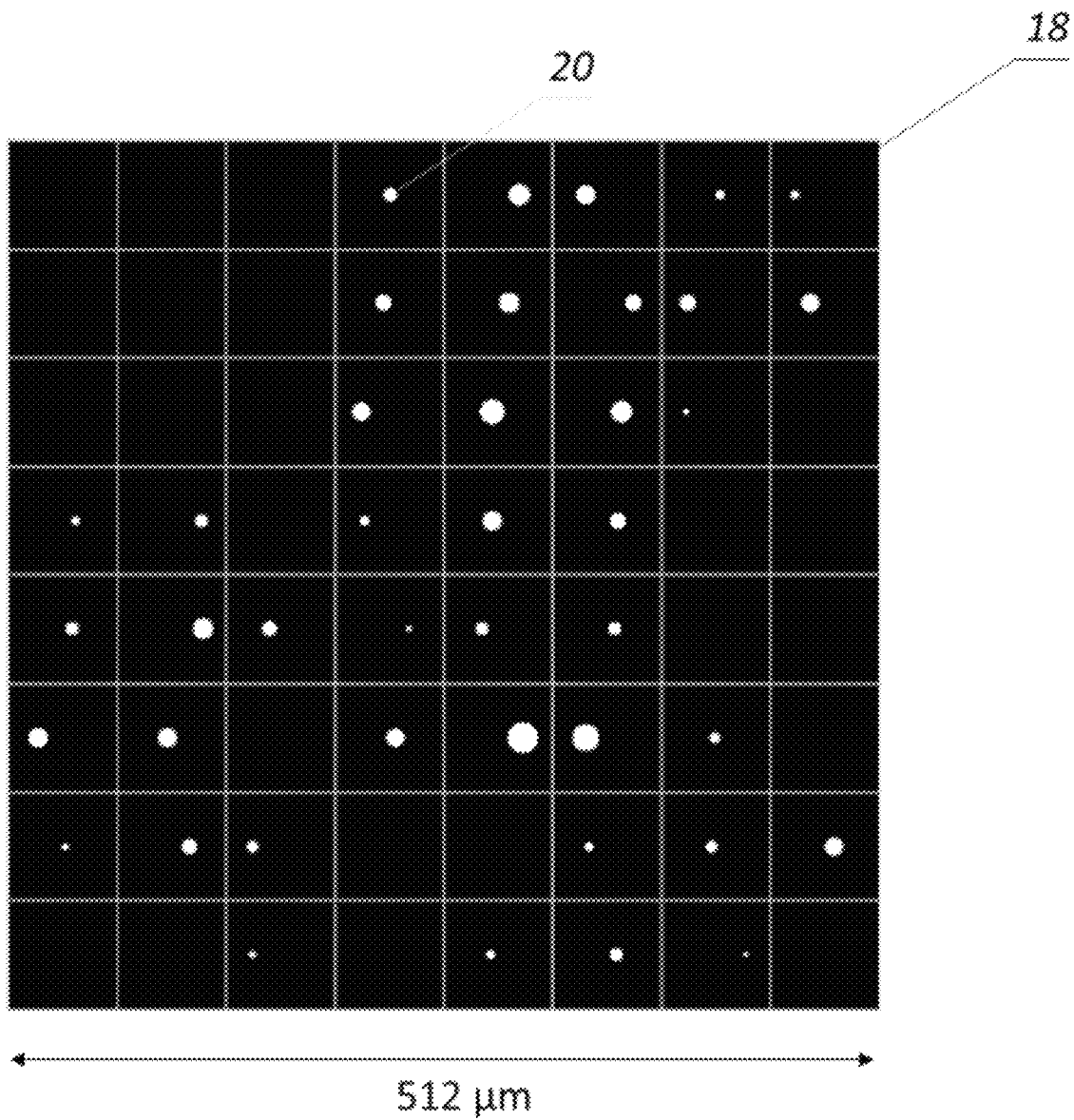
FIG. 6 shows a visualization of the areas switched under the influence of the exposures shown in FIG. 5.

As mentioned above, the pulsed recording beam 1 is intensity-modulated by the modulator 2 responsive in operation of the computer, such that the intensity of the spot produced by the constriction from the recording beam 5 (controlled as to the location of the constriction by the deflectable MEMS mirror 6) on the area of the opto-magnetic medium 7 is locally decreased. Such modulation, which in the exemplary arrangement is a smooth adjustment of the intensity of the beam, takes place before each act of recording a constriction spot in the opto-magnetic medium 7, by a single pulse from the laser. As a result of using variable light intensity at the recording location 18, the area of the respective illuminated area cell 19, illuminated by an intensity (energy) above the reaction threshold of the medium is variable and can be controlled. As a result, and as shown in FIG. 6, an area 20 proportional to the value of the amplitude in the corresponding complex sample 16 of the computer hologram is optically switched at the location of constriction exposure. As a result the modified Lohmann method of an exemplary arrangement makes it possible to obtain a binary hologram that modulates smoothly (i.e. non-discretely) both the amplitude and the phase of the reconstruction light illuminating and passing through the opto-magnetic medium 7. In other words, as a result of precisely controlling the position of the locations and the areas being switched 19, phase modulation of the reconstructing beam 8 by the opto-magnetic medium 7 is obtained. Moreover, through controlling by the modulator 2 the intensity of the recording beam 1, an effect is obtained in the thresholded opto-magnetic medium 7 that the magnitude of the area being optically switched 20 is dependent on the intensity of the recording beam 1, thereby obtaining a simultaneous ability to modulate the intensity of the light generated by illuminating the opto-magnetic medium with the reconstructing beam 8.

Figure 9:
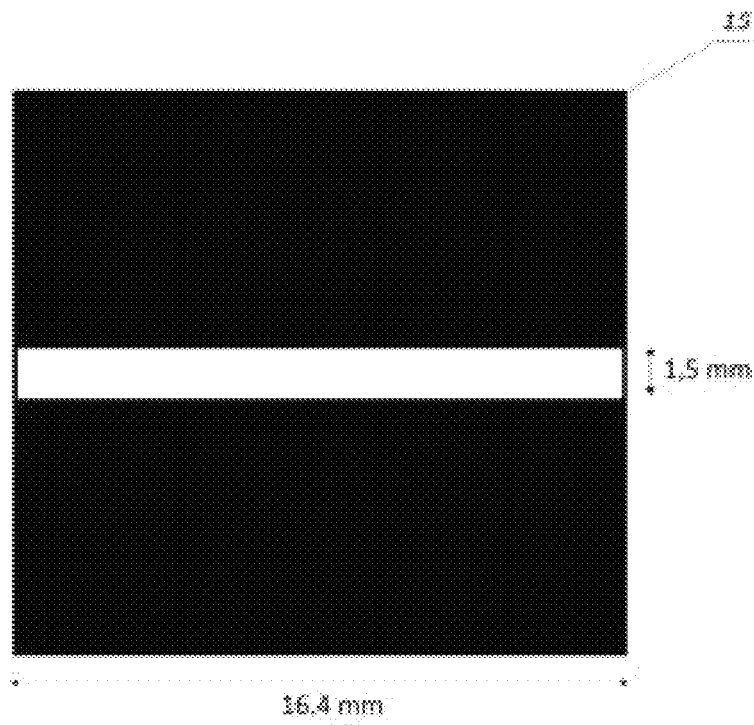
FIG. 9 illustrates the beam intensity transmittance through areas of the exemplary recording beam-shaping element used in exemplary arrangements.
Figure 10:
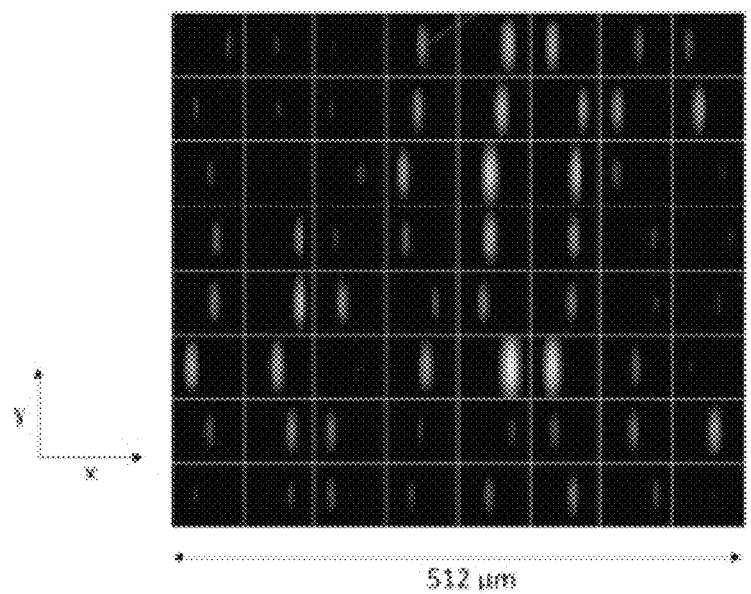
FIG. 10 shows a visualization of the positions and intensities of the exposure spots provided by the recording beam on the surface of the opto-magnetic medium in areas corresponding to the areas of FIG. 4.

In some exemplary arrangements the hologram representation may be recorded in a new and useful variation of the Lohmann method. In the exemplary arrangement a shaping element having the form of a plate 15 is introduced that spatially shapes the intensity modulated recording beam 1 prior to the beam being made convergent by passage through the aspheric lens. The exemplary shaping plate has the intensity transmittance shown in FIG. 9. In accordance with an exemplary arrangement, the beam-shaping plate 15 constitutes a diapositive with a shaded upper and lower field and a centrally and horizontally extending unshaded diapositive strip through which the recording beam 1 propagates. The exemplary transparent strip is of constant width. The purpose of the plate 15 that shapes the recording beam 1 is to change the shape of the constriction spots of light 19 (as shown in FIG. 6) from circular to elongated elliptical spots 25. A visualization of the positions and intensities of the elongated constriction spots 25 of the recording beam on the surface of the opto-magnetic medium 7 is shown in FIG. 10. In accordance with the exemplary arrangement, the elongation of the spot 25 is asymmetric and is increased only in the y direction (i.e. in the representation reaction plane of the optical system in FIG. 1, where the transparent strip in the shaping plate 15 extends orthogonally to the direction of elongation of the spots 25).

Figure 11:
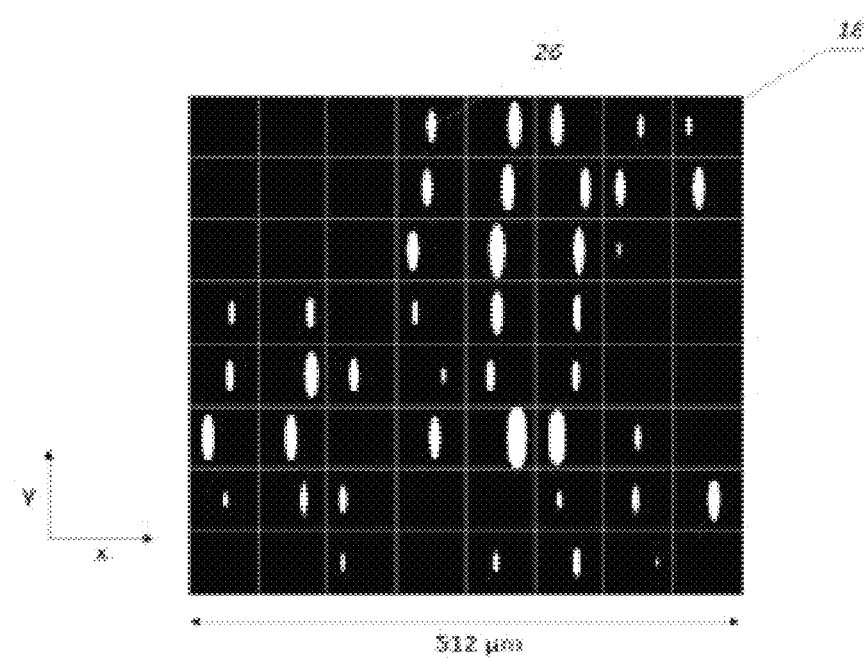
FIG. 11 shows a visualization of the areas switched under the influence of the exposures shown in FIG. 10.

This approach may be used in exemplary arrangements so that the space available for recording within each elementary cell 19 in the opto-magnetic medium 7 is utilized more effectively. The degree of elongation of the spots 25 in the y direction is inversely proportional to the width of the transparent strip in the shaping plate 15. The recording beam constriction which produces the spot in the recording plane in the opto-magnetic medium 7 is asymmetrical, which in an exemplary arrangement enables an approximately three times larger area of the opto-magnetic medium 7 to be utilized for recording, while maintaining the amplitude-phase modulation of the obtained hologram. Having the elongated elliptical constriction spots also reduces the deviation of the exemplary arrangement from the rectangular shape of the spots according to the Lohmann method. A visualization of the resulting constriction spots 26 obtained as a consequence of combining the exemplary intensity modulation of the recording beam by the modulator 2 and the spatial shaping of the recording beam by the shaping plate 15 is shown in FIG. 11. Of course it should be understood that the elongated spot configuration of this arrangement is exemplary and in other arrangements other shape configurations may be used.

Figure 12:
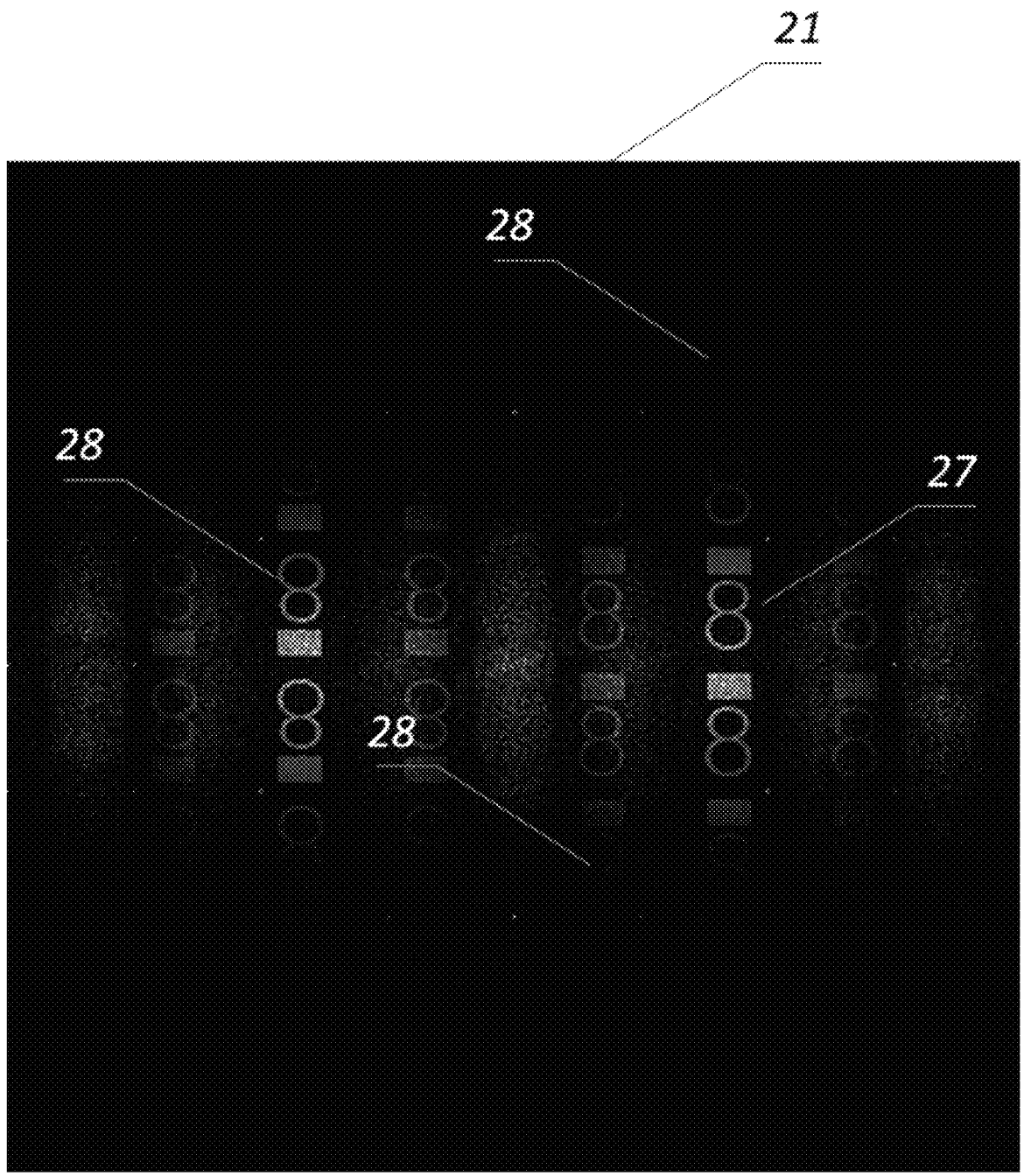
FIG. 12 shows a simulation of reproducing a holographic image from a hologram with a sample size of 64×64, recorded in the thresholded opto-magnetic medium using an elliptical spot according to an exemplary method through the optional use of the exemplary recording beam-shaping element.

FIG. 12 shows a simulation of reproducing a holographic image from a hologram with a sample size of 64×64, exposed in the opto-magnetic medium 7 using an elliptical constriction spot in accordance with the proposed method of the exemplary arrangement, with the optional use of the recording beam-shaping plate 15. It can be seen that in the case of using the recording beam-shaping plate 15, the useful diffraction image 27 has about three times greater brightness compared to the diffraction image 22 previously shown in FIG. 7. It should also be noted that the undesirable image duplicates 28 have lower visibility compared to the image duplicates 24 of FIG. 7. Moreover, as a result of better utilization of the surface available for recording in the opto-magnetic medium 7, that is achieved as a result of using the recording beam shaping element, the resulting noise of the diffraction image 27 (amounting to about 35%) is approximately 1.5 times smaller compared to the noise of the diffraction image 22 (amounting to about 51%) shown in FIG. 7.

Figure 2:
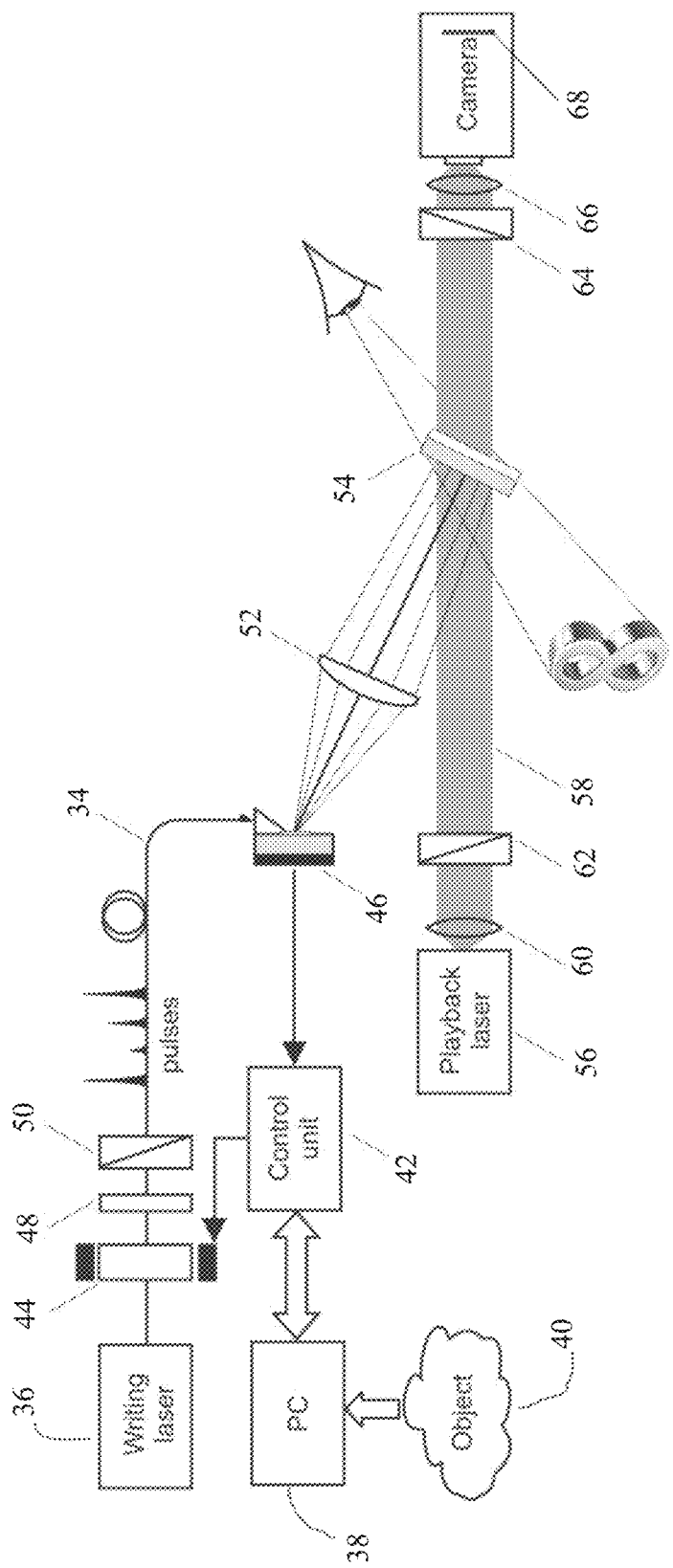
FIG. 2 is an alternative schematic diagram of an exemplary system for recording and reproducing a hologram in a transmissive configuration.

FIG. 2 shows schematically an alternative exemplary arrangement for recording and reconstructing holograms. In this alternative arrangement the recording beam 34 is produced by a laser 36 in a manner like that previously discussed. A computer 38 is operative to provide the CGH data corresponding to an object to be represented in the hologram referred to as 40. The signals from the computer that are used for producing the opto-magnetic constrictions on the medium is in operative connection with the control unit 42. Similar to the prior described system, the control unit 42 is in operative connection with a modulator 44 which is used to selectively modulate the intensity of the recording beam which is output from the laser, as well as to control a MEMS mirror 46. This enables the computer to control the modulator and the mirror in coordinated relation.

In this exemplary arrangement the modulated recording beam is passed through a shaping element 48. The shaping element may be similar to the shaping element previously described or may have a different configuration. After passage through the shaping element 48, the recording beam passes through a polarizer 50. The recording beam in this alternative arrangement is passed through an aspheric lens 52 and onto the surface areas of the opto-magnetic medium 54.

A reconstructing laser 56 which may be similar to that previously discussed, is operative to provide a reconstructing beam which is directed in a direction that corresponds to the angle at which the image from the medium will be reconstructed. The exemplary reconstruction beam 58 passes through a lens 60 and a polarizer 62 to illuminate the medium 54. The light of the illuminated reconstruction beam propagates through the medium to an analyzer 64 that is polarized and has an axis of polarization perpendicular to that of the polarizer 62. The beam is then focused via a lens 66 and onto a detection matrix 68 such as a CCD which produces the signals that are suitable for generating a visualization of the hologram. Of course it should be understood that this approach is exemplary of approaches that may be used for electronically rendering the hologram in a transmissive configuration.

Figure 3:
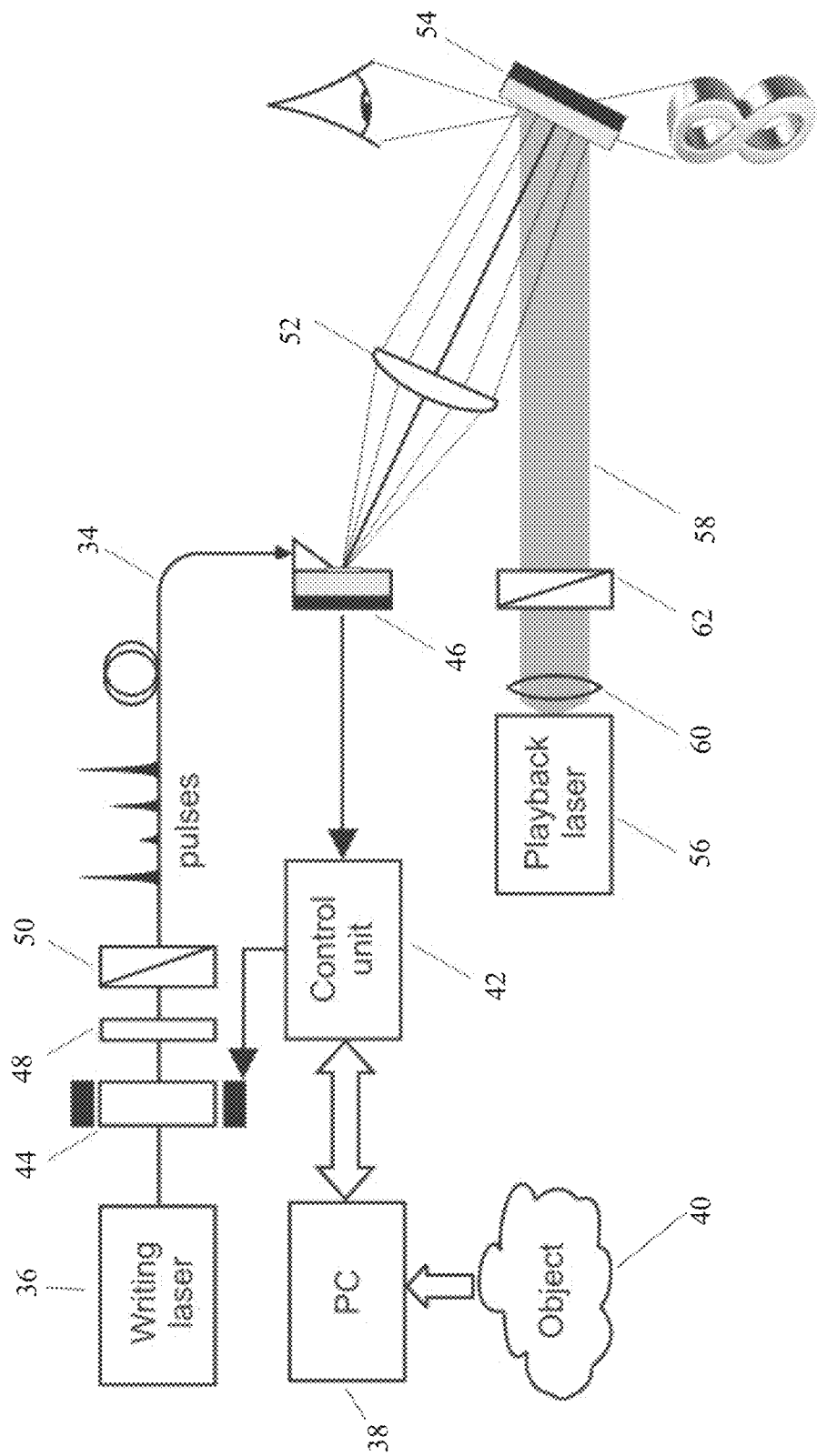
FIG. 3 is an alternative schematic view of an exemplary system for recording and reproducing a hologram in a reflective configuration.

FIG. 3 shows an alternative arrangement in which the hologram is rendered in a reflective configuration. In this exemplary arrangement the components common to the arrangement shown in FIG. 2 are numbered with the same reference numbers. However in this alternative configuration the hologram is reconstructed and observable via reflection from the opto-magnetic medium. Such approaches may be useful depending on the nature of the particular system in which the exemplary approaches are being utilized. Further it should be understood that other system configurations employing the principles described herein may be utilized.

In some exemplary arrangements it is useful to update the recording frames of the hologram at a rapid rate to produce holograms in rapid succession. This may be done to produce simulated movement and other display features. In some exemplary arrangements dynamic updating of optically written holographic frames can be done in three modes:
  (i) globally using a coil-induced external magnetic field;
  (ii) by all-optical serial restoring of all magnetic spots to the initial state; and
  (iii) selectively by differential exposures.

Although these modes may exhibit similar performance there are practical benefits of operating remotely and without any external fields. The third mode comprises all-optical toggling of the magnetic states limited to those CGH points selected by a logical XOR operation between k and k+1 states (frames) of the input 3-D scene data. Although this approach doubles the number of required holographic computation units (for example FPGA—field-programmable gate array), it results in an approximately two-fold reduction in the number of femtosecond laser exposures, potentially allowing the refreshing of a CGH comprising 2·5.6=11.2 million points at 180 Hz framerate. In some arrangements the complete images may be reconstructed in a far field diffractive plane while the point-by-point recording is still in progress, i.e. without strict division to subsequent holographic frames in time domain.

The opto-magnetic CGH recording throughput may be scaled up even further, without considerable limitations. This can be achieved in some arrangements by writing several areas of the sample medium simultaneously after adding more MEMS mirrors, each with a dedicated computation unit (for example an FPGA), and a writing laser beam. As an example, using four such units allows the rewriting of CGHs comprising approximately 45 million points at 180 Hz, enabling color-sequential operation with excellent resolution. In such an arrangement, operating at low numeric aperture (NA) values greatly facilitates the focusing of multiple writing beams on the medium recording the hologram. The picosecond switching cycles of holographic cells provides the potential to be used as ultra-rapid reconfigurable transmissive diffractive optical elements. Such cells may be used in place of ferroelectric LCoS SLMs or Digital Micromirror Devices in selected cases of optical trapping, manipulation of optical vortices, orbital angular momentum, optical interconnections, multiplexers and switches, reconfigurable add-drop multiplexers and electronic circuits. For such purposes, useful sophisticated optical functionalities are achievable with CGHs containing as few as 128×128 points that can be computed and updated at 4 MHz rates with four parallel operating units comprising MEMS and a computation subsystem (for example MEMS FPGA).

Figure 13:
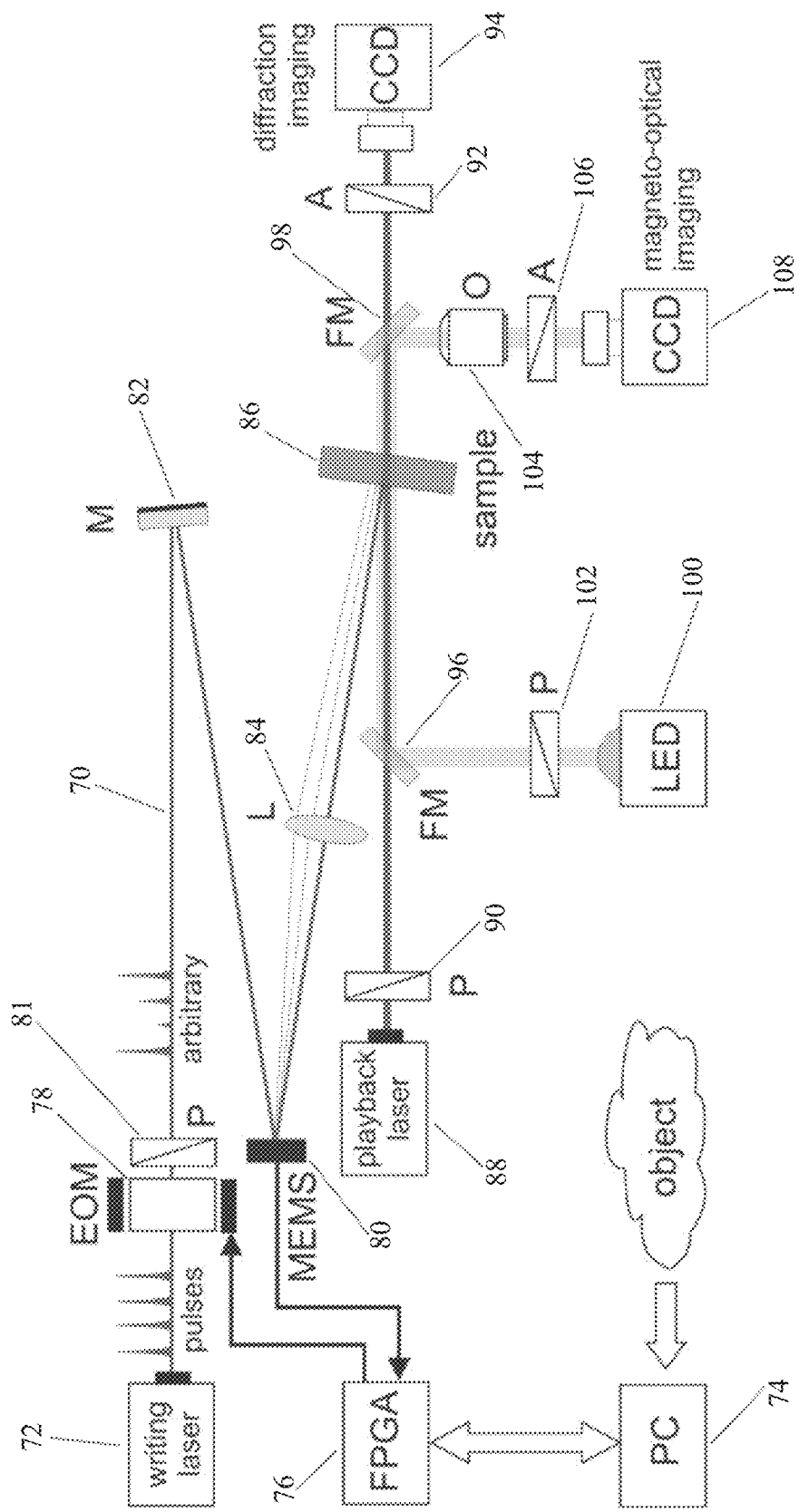
FIG. 13 is a schematic view of the system that is usable for acquisition of diffraction and opto-magnetic images using the Faraday effect in a transmission geometry.

FIG. 13 shows schematically an arrangement for CGH writing and acquisition of diffraction opto-magnetic images using the Faraday effect in a transmission type geometry. In this arrangement the recording beam 70 is produced by a laser 72 of the type previously described. A computer 74 provides the signals based on the object to be produced in the hologram, to a subsystem which includes the FPGA 76 which is in operative connection with an electro-optical modulator 78 and the MEMS type mirror 80. The recording beam is delivered to the MEMS mirror 80 through a polarizer 81 and from a reflective mirror 82. From the MEMS mirror 80 the recording beam is passed through a convex lens 84, which in the exemplary arrangement has a 100 mm focal length to produce a convergent beam which produces the constriction on the medium 86. The exemplary arrangement further includes a laser 88 that produces a reconstruction beam. The exemplary system further includes a polarizer 90 through which the reconstruction beam passes. The system further includes an analyzer 92 which also provides a polarizing function and has an axis of polarization perpendicular to that of the polarizer 90. The exemplary arrangement further includes a CCD camera 94.

The exemplary arrangement further includes a flip mirror 96 which is positioned on the side of the medium 86 toward the reconstruction laser. A further flip mirror 98 is positioned on opposed side of the medium 86. An LED light source 100 within associated polarizer 102 is configured to produce a beam that can be selectively directed by the flip mirror 96 through the sample. An objective lens 104 and a further analyzer 106 which includes a polarizer with an axis of polarization perpendicular to polarizer 90, are positioned in aligned relation with a selectively positionable flip mirror 98. A further CCD camera 108 is aligned with the objective lens 104 and the further analyzer 106. As can be appreciated this arrangement enables the hologram recorded on medium to be captured via camera 94 or 108. It further should be understood that when used herein any given fragment of a recorded CGH will be considered a holographic pattern.

In exemplary arrangements the magnetic holograms in the sample medium were visualized using a magneto-optical polarizing microscope. The polarized light source was the LED lamp 100 with the output routed into the optical path of the probe beam of laser 88. The LED light then passed through the sample on the medium 86 and was gathered with the objective lens 104 before passing an analyzer 106 and hitting the CCD camera 108. The magnetic contrast in such a polarizing microscope comes from the fact that magnetic spots with different perpendicular magnetization orientations to the sample plane will give a different rotation of the polarization plane (effect of Faraday rotation), and thus the light passing through them will acquire different polarization, which can be easily detected on the CCD camera 108. After recording, the hologram stays unchanged for a long time due to the non-zero coercivity in the medium 86.

In an exemplary arrangement measurements were done without applied external magnetic fields and at room temperature. The images of magnetic hologram and diffraction on the medium 86 were taken before and after the CGH recording. The difference of these images was used to visualize the pure magnetic hologram in the magneto-optical images and subtract the zero-order light in the diffraction images as presented in FIG. 16. The initial background image on the medium 86 before CGH recording was obtained after the application of a brief external perpendicular magnetic field with >80 Oersted (Oe). Such magnetic field was also used to erase the entire recorded CGH magnetic pattern. The diameters of magnetic spots were adjusted by changing the pump intensity with an electro-optical modulator (EOM) 78, assisted by a polarizer 81 (see FIG. 13).

Figure 14:
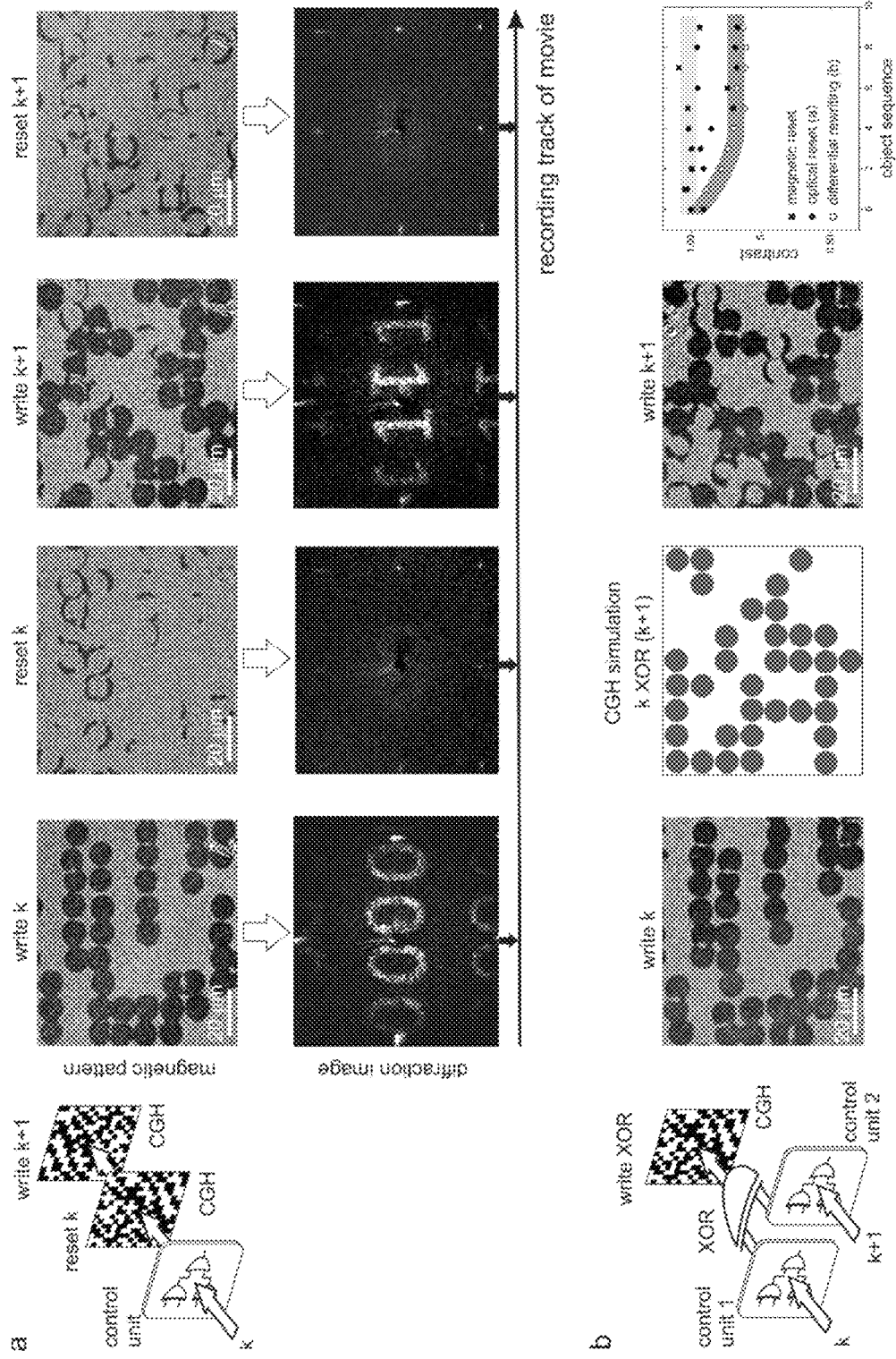
FIG. 14 is a graphic representation showing dynamic rewriting of holographic frames.

FIG. 14 shows dynamic opto-magnetic rewriting of subsequent holographic frames. The upper line designated (a) in FIG. 14 demonstrates an optical reset mode comprising subsequent writing of k and k+1 holographic patterns using a toggle regime of an AOS. From left to right is shown writing of hologram k which required 40 exposures (a fragment of the real magnetic hologram). Next as shown to the right a reset stage with the magnetic spots toggled to their initial state with extra 40 exposures. Next shown to the right is the writing of next hologram k+1 which required 34 exposures. The final stage shown to the right is a second reset stage such as in a track of a movie required another 34 exposures (148 exposures in total for re-writing). The lower line designated (b) in FIG. 14 demonstrates a differential rewriting mode. From left to right is shown a computation scheme using two separate computation units (for example FPGA). The writing of k hologram required 40 exposures. The next frame shown to the right corresponds to computation of the logical XOR between the k and k+1 frame. Next shown to the right is writing of k+1 frame which required 35 exposures (the differential mode allowed an almost twofold, i.e. 148/(35+40) reduction of the number of required exposures). The final image shown to the right in the lower line of FIG. 14 is experimental contrast of reconstructed images as a function of rewriting sequences for all rewriting modes.

In FIG. 14 the middle line of panels of diffraction images shows a visualization of holographic frames. The visible remnant magnetic domains in images of the magnetic hologram after resetting are caused by long-lived motions of domain walls within milliseconds after AOS. This magnetostatic effect causes minor off-axis background noise, and as a consequence the reduction of the contrast of holographic playback frames becomes negligible after a sequence of four write-reset acts, as shown in the last middle panel of the Figure. The bands in the graph represent the moving average value and their thickness is equal to the standard deviation doubled. The size of the shown magnetic holograms is 106×96 μm².

An alternative approach of an exemplary arrangement is circular detour-phase encoding. A limitation of the opto-magnetic medium is the binary modulation of the playback (reconstruction) light that inevitably induces conjugate images in the diffraction field. By introducing the variation of Lohmann encoding effectively switching to complex (amplitude and phase) modulation, while still operating in binary-amplitude medium was performed. The non-pixelated and intensity-threshold AOS in the GdFeCo sample medium allows writing in precise locations on the medium circularly shaped magnetic spots to form "openings" of Lohmann cells. In an exemplary arrangement the multiple AOS with constant diameters of magnetic spots were used to build approximations of the classical Lohmann rectangular openings (see FIG. 15 lines a and b). The results demonstrate the elimination of conjugate terms and consistency with simulation. Nevertheless the asymmetrical suppression of higher diffraction orders was also observed. In order to overcome this, in an alternative arrangement a modified detour-phase encoding using single-shot circular openings (see line c of FIG. 15) was utilized, which resulted in the symmetrical suppression of higher order image duplicates in the far field, as shown in the final frame to the right in line c on FIG. 15. The diameter of each opening d(I) was adjusted by modulating the intensity of the recording beam on-the-fly, which differentiates this exemplary approach from previous serial writing attempts with fixed spot sizes. In addition, this feature reduces the total number of exposures per holographic frame up to three times, as compared to asymmetric detour-phase encoding seen in line b of FIG. 15.

Figure 15:
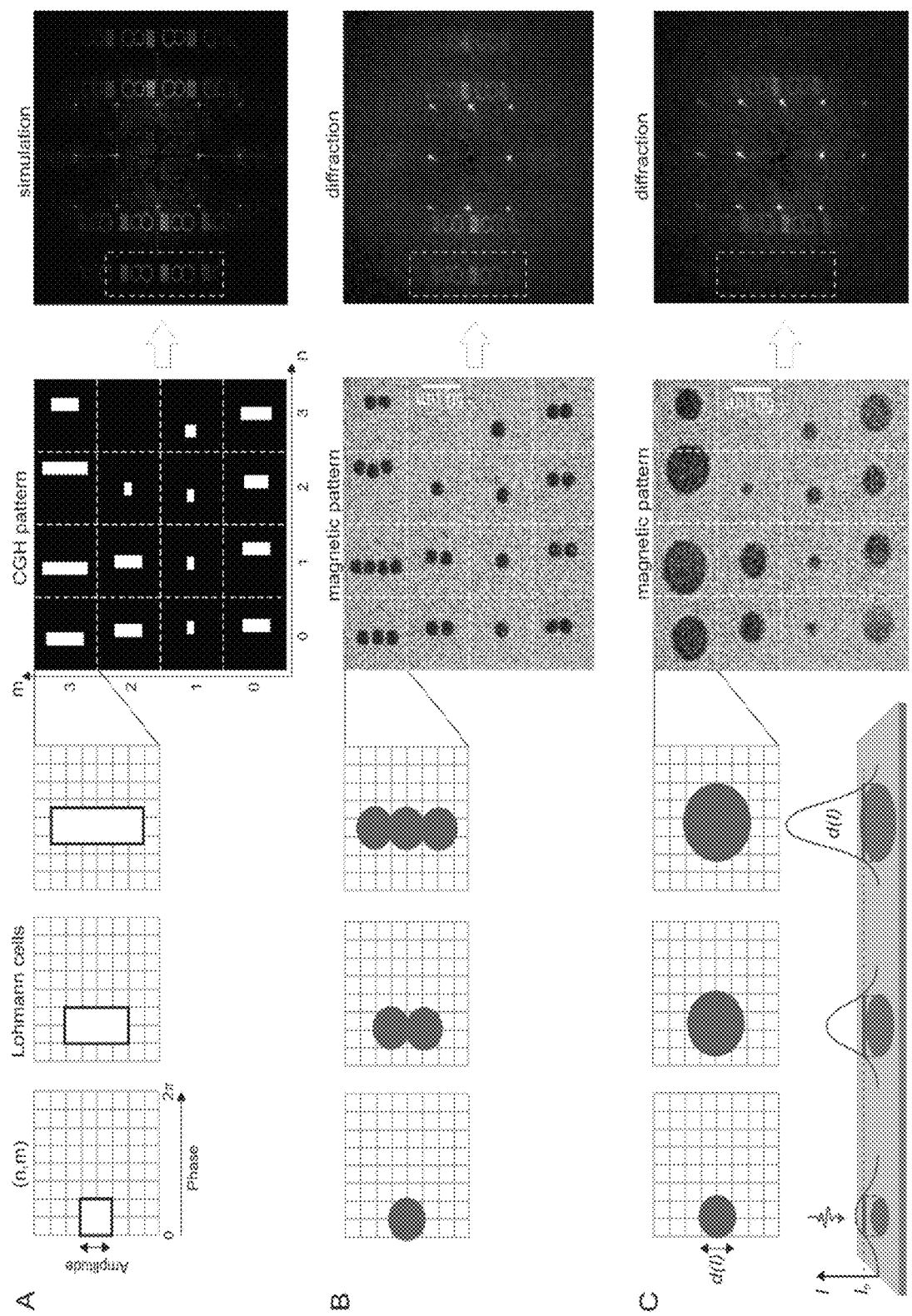
FIG. 15 is a graphic representation of complex opto-magnetic holograms showing an example of detour-phase encoding.

Line a of FIG. 15 shows a simulation of classical detour-phase encoding using the Lohmann method. The heights and offsets of rectangular apertures are linear functions of the amplitude and phase values from a given CGH cell, respectively. Suppression of the conjugated images is notable.

Line b in FIG. 15 shows from left to right, the variation of an exemplary arrangement that provides approximation of the rectangular Lohmann openings with multiple point-by-point exposures switching magnetic spots of fixed diameters. The middle graphic in line b shows a fragment of written magnetic hologram. The final graphic in line b is an experimentally acquired diffraction image showing asymmetrical visibility of higher-order image duplicates (marked by a dashed rectangle) originating from regularly spaced Lohmann cells.

Line c in FIG. 15 shows from left to right a variation of a further exemplary arrangement including a visualization of writing of three adjacent Lohmann cells with circular switched magnetic spots of diameters set by in-the-loop modulation of the pump beam intensity. The next graphic is a fragment of the written magnetic hologram. The final graphic represents an experimental reconstruction showing the symmetrical suppression of higher-order image duplicates. In this exemplary variation the diffractive efficiency is estimated at 1%. The size of magnetic hologram images is 320×320 μm².

The exemplary approaches are carried out at room temperature in non-contact mode using ultrashort laser pulses, which is supported by the availability of all-fiber femto- and picosecond lasers operating within 1-10 GHz. Exemplary methods provide rapid serial writing and optical refreshing of CGH in non-pixelated, large-area, readily manufacturable, transparent (or reflective) medium as an updateable holographic non-volatile memory. In exemplary arrangements the memory requirements, computational complexity and size of all used optical components do not have to scale up with the size and resolution of the hologram. Exemplary arrangements enable all-optical switching with longer picosecond pulses of low fluence, such as in dielectrics or metallic [Tb/Co] multilayers. Furthermore, employing the exemplary methods in nanostructured media may be useful for volume multi-color holographic recording approaching sub-wavelength resolution. Although in some exemplary arrangements CGH spot sizes in the range of 10 μm are utilized, denser writing in the sub-μm regime, which may be more useful for holographic displays, may be achieved down to about 60 nm with nano-engineered samples of similar composition. The complexity of the cloud-point representation of the input object can be improved about 40-fold by using a combination of FPGA-based recurrence algorithm and e-ASIC implementation. These useful features combined with the scalable computation scheme and ultra-low requirements for computer memory may be useful for high-resolution holographic 3-D TV displays and ultra-wide angle near-eye augmented/virtual reality goggles.

In some exemplary methods the opto-magnetic medium utilized is ferrimagnetic alloy with the composition AlTi (10 nm)/$Si_3N_4$ (5 nm)/$Gd_{24}Fe_{66.5}Co_{9.5}$ (20 nm)/$Si_3N_4$ (60 nm). In exemplary arrangements the medium is prepared by magnetron sputtering on a glass substrate. The exemplary sample medium used was 15×15 mm² in size and optically transparent in the visible spectral range. The exemplary alloy used has perpendicular orientation of the magnetization and shows a square shape of the hysteresis loop with a coercive field of 75 Oe. In exemplary arrangements such alloy medium was used for all-optical magnetic switching (AOS) with a single femtosecond laser pulse by a toggle regime. The AOS effect in GdFeCo alloys is driven by ultrafast and efficient thermal demagnetization at a characteristic time of about 30 ps after a single recording beam pulse. The exemplary medium provides a unique medium for CGH recording of magnetic hologram with a spatial redistribution. The magnetization switching does not depend on the pump beam polarization within the whole VIS-NIR (visible near infrared) spectral range.

In some exemplary arrangements the opto-magnetic medium may comprise a plurality of metallic films made of different composition materials and different concentration of components including GdFeCo, GdFe, GdCo, FeMnPt, Co/Pt, Co/Pd, Fe/Pt, Tb/Co, MnRuGa, HoFeCo, and/or TbCo.

In some exemplary arrangements, the opto-magnetic medium may comprise a plurality of metallic magnetic layers separated by non-magnetic spacer layers.

In some exemplary arrangements the opto-magnetic medium may be provided on a substrate which is selected from a group comprising MgO, Si, GaAs, GaN, $SiO_2$, $Al_2O_3$ and glass.

In exemplary methods the magnetic hologram is recorded in the optically transparent GdFeCo film on a point-by-point basis with the use of MEMS-steered single linearly polarized ultrafast recording beam pump pulses (see FIG. 13). The exemplary method utilizes a pulse duration of 35 fs during which the hologram is written and erased. The central wavelength of the exemplary method is $\lambda$=800 nm and a maximum repetition rate of 1 kHz (using an Astrella™ Coherent Laser). In some arrangements, the repetition rate of the laser pulses can be scaled up to 10 GHz frequency, but is limited by the mechanism of AOS in GdFeCo alloy medium. In an exemplary method the pump beam with the fluence below 20 mJ·cm$^{-2}$ is focused to a spot of 50 µm in diameter using a lens of f=100 mm placed before the medium sample. The diameter of the pump beam at the lens is 2 mm, which is equivalent to the numerical aperture (NA) of 0.01. By lowering the pump beam intensity and taking advantage of the threshold effect of the medium, the optically switched areas of c.a. $d_s$=10 µm can be achieved in the same optical configuration, which was equivalent to NA=1.22·$\lambda$/(2·$d_s$)=0.05. In alternative arrangements with optimization of the sample medium composition and reduction of the size of spots, writing of holograms with energy-efficient ultrafast all-fiber lasers may be achieved.

Figure 16:
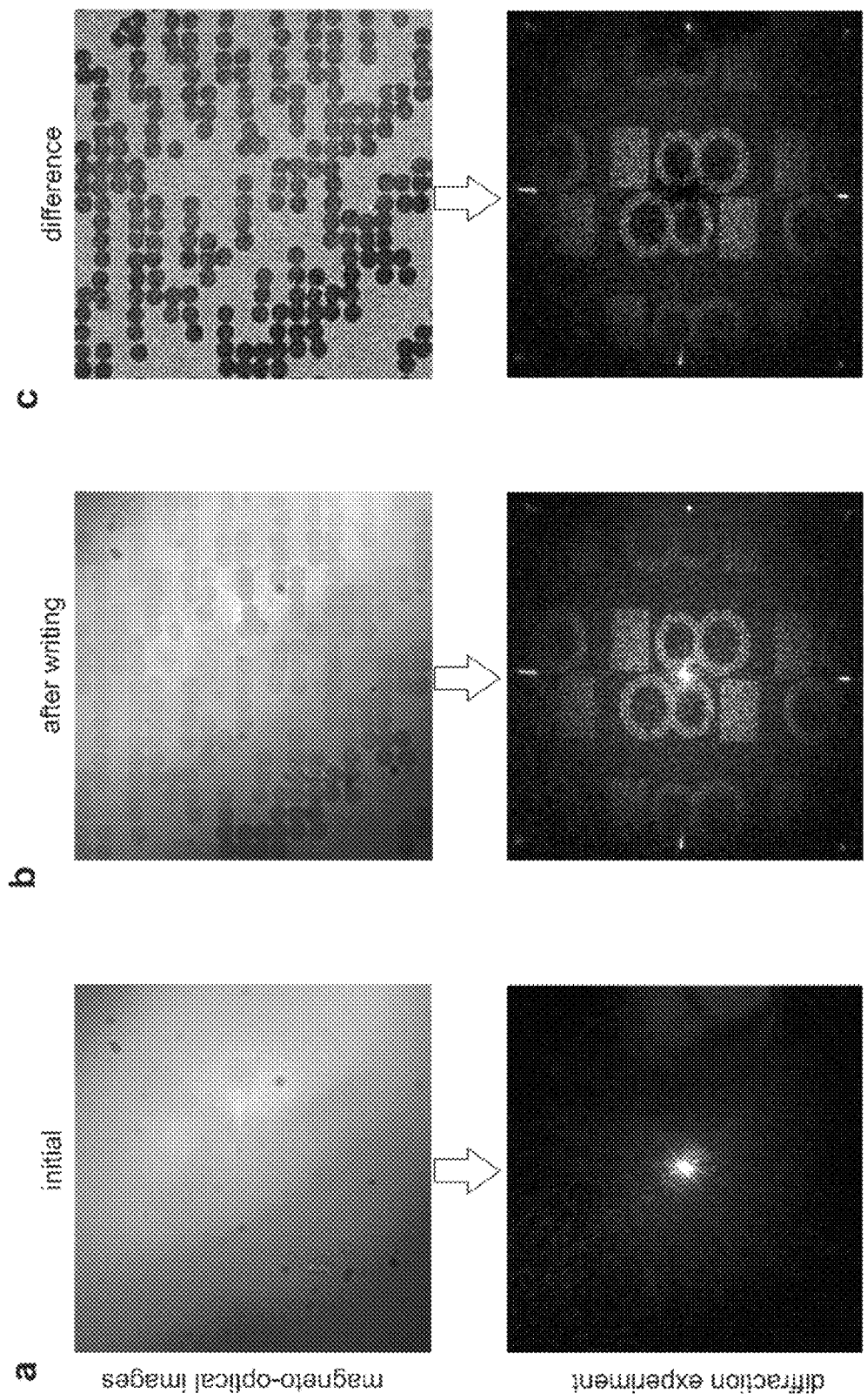
FIG. 16 is a graphic representation of CGH writing and reading.

As previously discussed FIG. 16 shows from left to right both the magneto-optical (top panels) and diffraction (bottom panels) images in the GdFeCo sample medium before the opto-magnetic writing (left vertical column a), after writing (middle vertical column b), and the difference between these images (right vertical column c). The exemplary magneto-optical images show the area of 200×200 µm$^2$.

Figure 17:
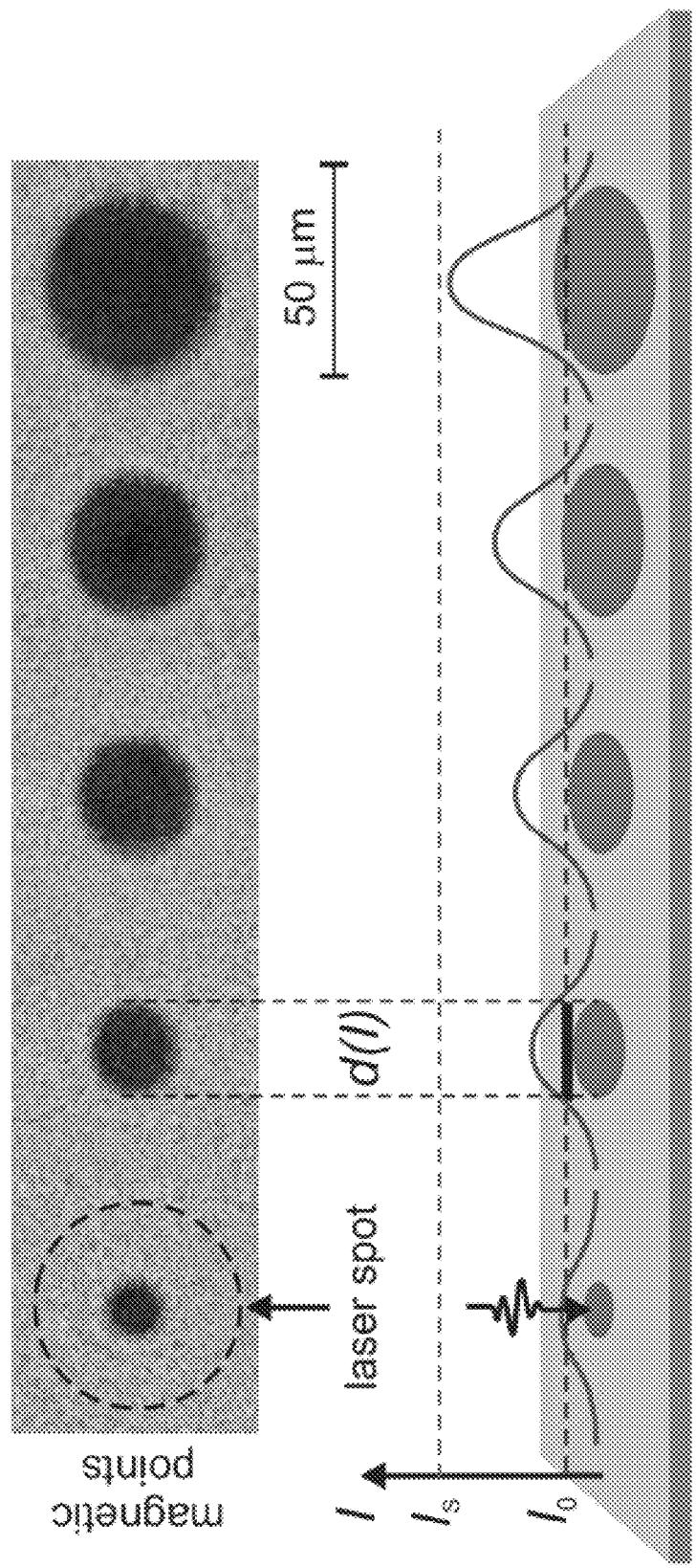
FIG. 17 graphically represents the writing of single magnetic points using all optical switching (AOS).

FIG. 17 represents the writing of single magnetic points using AOS. The images of reversible writing by AOS magnetic points with a different writing beam pump fluence from left to right show: 12 mJ·cm$^{-2}$; 14.2 mJ·cm$^{-2}$; 15.6 mJ·cm$^{-2}$; 17 mJ·cm$^{-2}$ and 20 mJ·cm$^{-2}$. The lower horizontal dashed line in FIG. 17 indicates the switching threshold and the upper horizontal dashed line represents saturation of the laser pulse intensity I. The laser spot also denotes the diffraction limit of the optical configuration of writing process.

Figure 18:
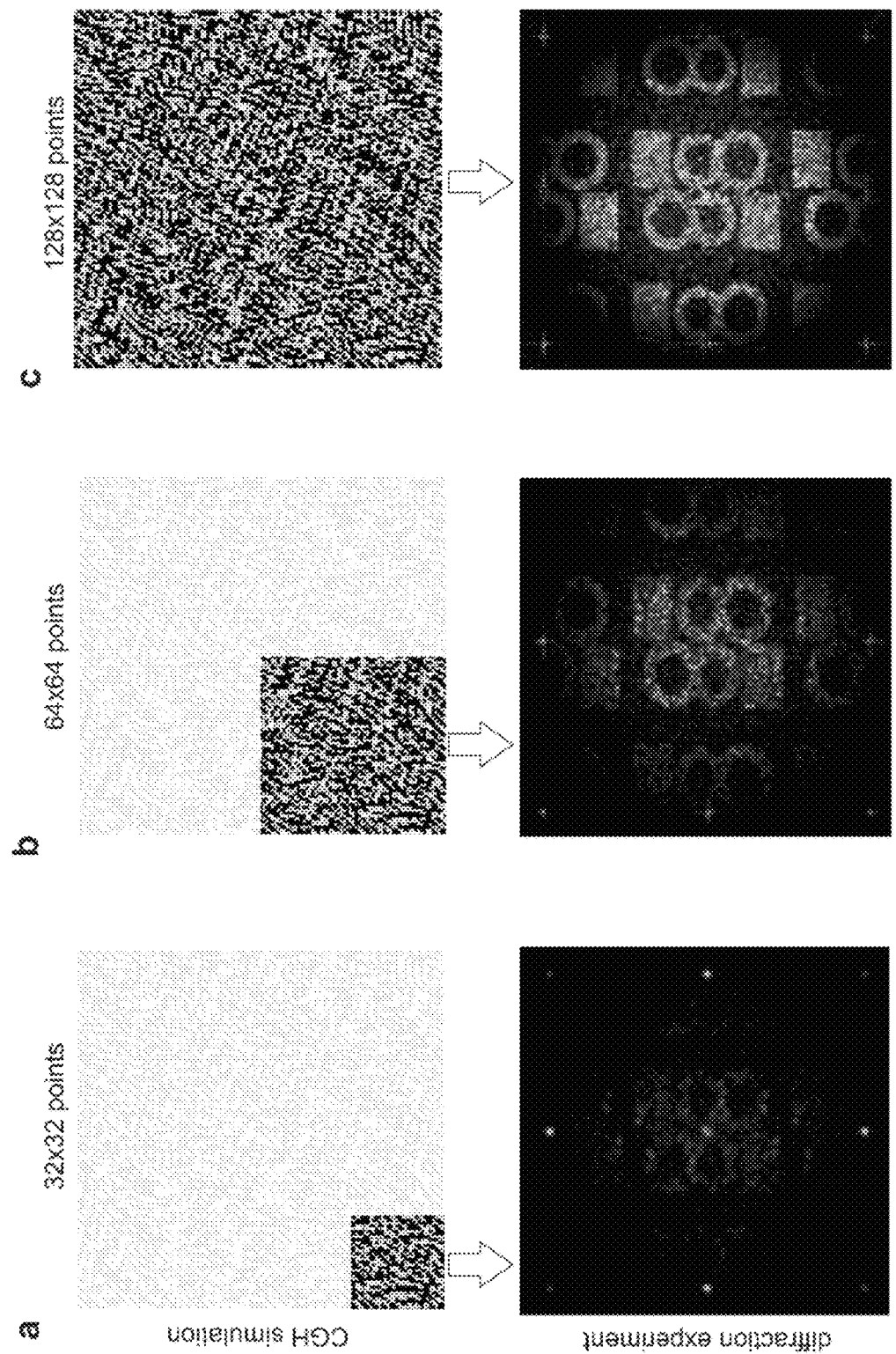
FIG. 18 is a representation of a CGH hologram and reconstructed far field diffraction images during progressive writing of 32×32, 64×64 and 128×128 holographic points.

The exemplary operation of the arrangement shown in FIG. 13 is carried out in a manner like that previously discussed. The current angles of the free-running MEMS mirror 80 are reported to the FPGA unit 76. Based on the returned binary signal, a single laser pulse is transmitted through the intensity modulator (EOM) 78 and switches the magnetization in the medium 86. The procedure is repeated immediately after the next angle of the MEMS 80 is available, allowing uninterrupted point-by-point recording. In the exemplary arrangement another laser pulse directed at the same written magnetic spot on the medium 86 reverses it, allowing for a rapid change of the hologram into another one, with the possibility of reusing unmodified points. In exemplary arrangements the hologram is recorded as domains with magnetization orientations opposite to the initial state, using the laser-induced switching of the medium. The image encoded into the hologram recorded on the medium 86 is reconstructed in real-time during the writing process by means of the magneto-optical Faraday effect in the optically transparent sample 86 (see FIG. 13). The magnetic sample has a large Faraday rotation angle, which results in clearly recognizable diffraction images. When increasing the CHG writing density due to the gaussian shape of the laser pulse constriction, the overlapping effect of magnetic spots is observed. In the exemplary arrangement, there is observed the toggle effect in areas between subsequent written spots. Despite this, the quality of far field reconstructions of the written holographic patterns is unchanged. In other arrangements the overlapping effect could be useful for holographic writing of practically unlimited number of CGH points with arbitrary fill factor values. The serial mechanism of the exemplary CGH writing allows the appearance of the recognizable holographic image during unfinished rewriting of the holographic frame. In FIG. 18 (left side column a), the time trace of the display's diffraction image, which is recognized for the minimal number of 32×32 points as demonstrated. This feature is observed only during serial writing and can be attributed to the non-volatile memory effect in the medium.

FIG. 16 shows in the top horizontal line CGH reconstructed far field diffraction images during a progressive writing of a) 32×32; b) 64×64; c) 128×128 holographic points. This demonstrates the capabilities achieved from the higher number of constriction locations on the medium.

In some exemplary arrangements circular detour phase encoding is utilized as previously discussed. The test holograms for complex encoding for this useful variation inspired by the Lohmann method, were computed as Fourier transforms of the input images having 512×512 pixels, with a random initial phase. For each of the 512×512 variant Lohmann cells, the amplitude and phase values were extracted, denoted as a(n,m) and φ(n,m), respectively. The writing beam was then positioned inside a given cell, offset from its center by the distance:

$$\delta x(n, m) = \varphi(n, m) \frac{\Delta x}{2\pi}, \tag{1}$$

where $\Delta x = \Delta y$ were the dimensions of each variant Lohmann cell. The diameter of the optically switched area d(n,m) was directly connected with the amplitude a(n,m) with the relation:

$$d(n, m) = \frac{b|a(n, m)|}{\Delta x}, \tag{2}$$

where the b=0.7 margin was found in numerical optimizations in order to allow minimally invasive overlapping of Lohmann openings in adjacent cells. The femtosecond writing beam had the gaussian intensity profile with the gaussian waist diameter being a function of the used numerical aperture (NA) of the focusing optics. The appropriate intensity I of the writing beam was adjusted to induce the magnetically switched circular area of the desired diameter d (see FIG. 17), by matching d(I)=d(n,m) in a look-up table filled according to the below formula:

$$d(I) = 2\sqrt{-\frac{1}{2}w_S \ln\left(\frac{I_S - I}{I_S - I_0}\right)}, \quad (3)$$

where the minimal (threshold) intensity of the beam inducing the smallest optical switching is equal to $I_0$ (represented by the lower horizontal dashed line) while the maximal intensity, causing the entire sample to optically switch (saturate) is equal to $I_s$ (represented by the higher horizontal dashed line). The NA-dependent gaussian waist diameter of the exemplary saturating writing beam is equal to $2w_s$ (measured at $1/e^2$ of the peak intensity $I_s$).

Figure 19:
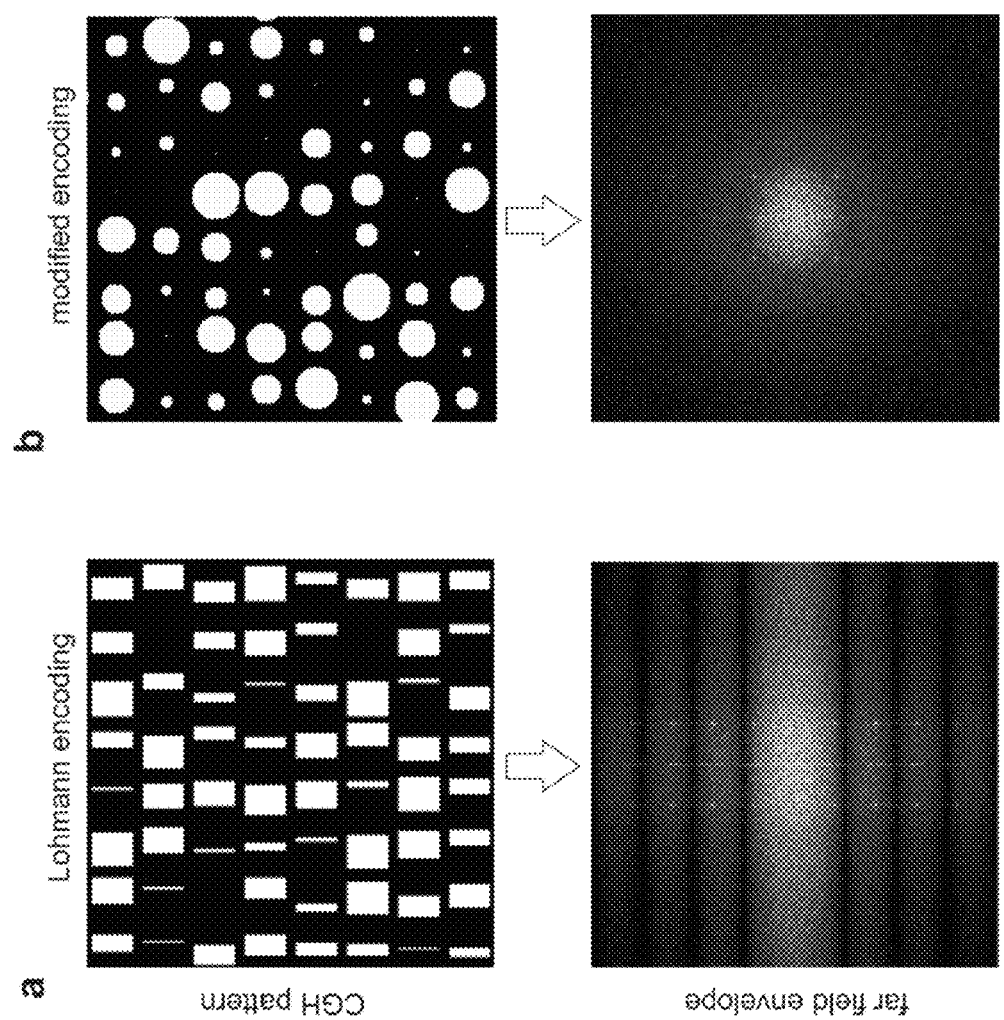
FIG. 19 is a representation of complex encoding of CGH and modified Lohmann encoding using circular openings.
Figure 20:
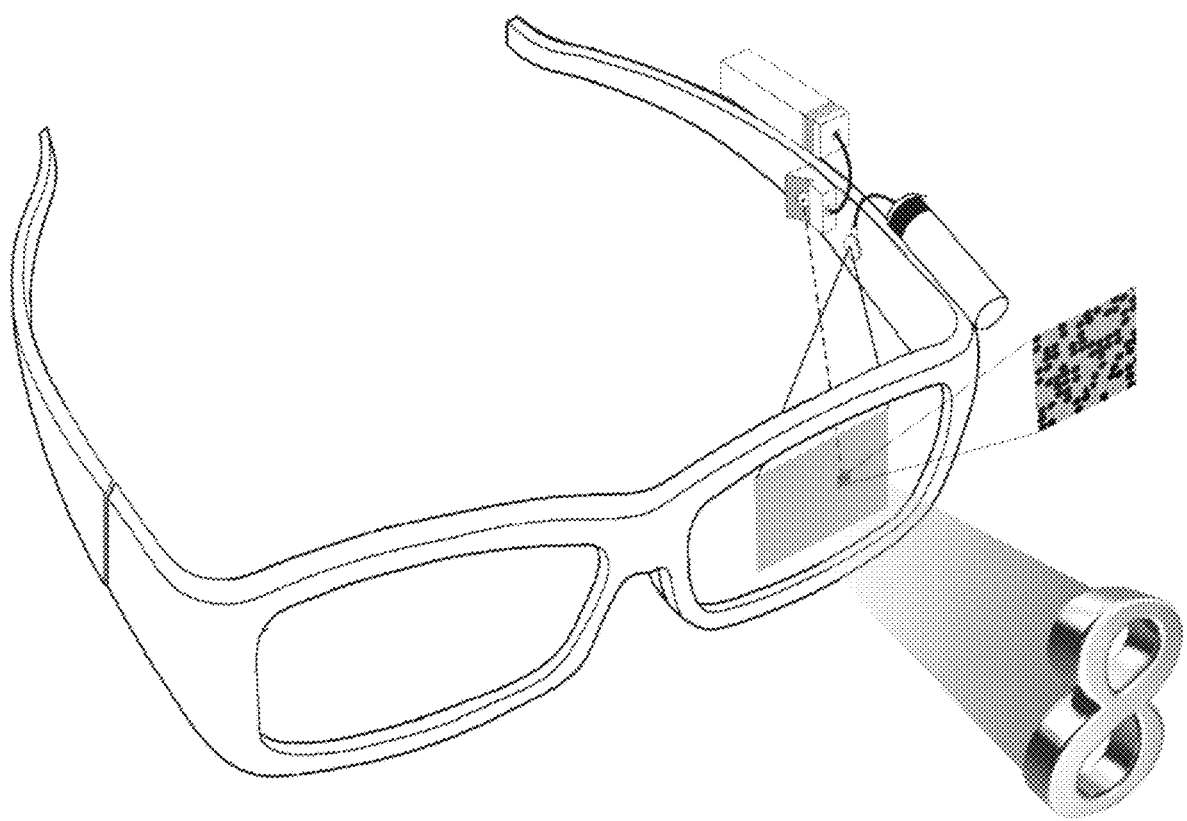
FIG. 20 shows an arrangement that utilizes a reflective configuration for producing a 3D holographic video display in virtual reality or augmented reality goggles.

In this useful exemplary variant the rectangular openings in the Lohmann cells were replaced with circular ones, with the effect of symmetrical intensity envelope in far field holographic reconstructed field, attenuating higher order terms (see FIG. 19). Since the CGH plane $(x_1, y_1)$ and far field playback plane $(x_2, y_2)$ are in the Fourier relation, the attenuated reconstructed intensity field can be derived as:

$$\mathcal{F}\{[h(x_1,y_1)\cdot\text{comb}(x_1,y_1)]\otimes\text{circ}(x_1,y_1)\} = [H(x_2,y_2) \otimes\text{comb}(x_2,y_2)]\cdot J_1(x_2,y_2), \quad (4)$$

where h and H are the CGH data and the reconstructed image, respectively, comb function is the periodicity of the variant Lohmann cells, and circ function denotes the circular shape of the openings used for CGH encoding. The resultant Bessel function $J_1$ is responsible for the symmetrical envelope, attenuating off-axis components in the playback signal.

FIG. 19 represents shaping of the far field intensity envelope with the exemplary variant of Lohmann encoding utilizing circular openings.

Magnetic spot switching in the GdFeCo sample medium occurs above a certain energy intensity threshold with a size dependent on the intensity of the femtosecond or other laser pulse. Because a symmetric gaussian recording beam is used for writing in this exemplary arrangement, well defined circular areas are switched with diameters falling below the diffraction limit, marked in FIG. 17. This feature of some exemplary arrangements allows the dense packing of highly localized CGH spots. Reversible point-by-point writing of holographic patterns by phase change of $Ge_2Sb_2Te_5$ medium was achieved with a numerical aperture (NA) of 0.8. In contrast, an exemplary opto-magnetic method uses low NA of 0.01 that is supported by the threshold effect, allowing convenient recording of CGH spots with sizes below d=10 µm at a working distance of 100 mm. The exemplary method is only limited by the working distance and achievable angles of the MEMS. The speed of femtosecond laser beam scanning can considerably exceed the inertial limits of a MEMS mirror; therefore, the pace of holographic recording may be limited by the laser pulse repetition rate and speed of the FPGA clock (availability in exemplary arrangements up to 1 GHz). For instance, a gigahertz femtosecond laser may allow non-volatile rewriting of CGHs comprising 5.6 million points at a 180 Hz framerate with the proposed exemplary method. This is superior to typical Full-HD LCoS SLMs that feature a similar framerate but having only 1920×1080 pixels (2.1 million). Of course it should be understood that these approaches are exemplary and in other arrangements other approaches may be used.

FIG. 18 shows an exemplary arrangement which implements a reflective configuration of the type previously described in FIG. 3. In this exemplary arrangement the reflective configuration is implemented in the form of a wearable 3D holographic video display. The display may be included in virtual reality or augmented reality goggles. In this exemplary arrangement at least one writing laser beam is steered by at least one MEMS mirror and focused on the surface of the opto-magnetic reflecting medium creating a holographic pattern. A reconstruction laser or other coherent light source illuminates the medium. The reflected pattern causes the light from the medium to reach the eye of the observer.

Thus the exemplary arrangements achieve improved operation, eliminate difficulties encountered in the use of prior devices and methods, and attain the useful results that are described herein.

In the foregoing description certain terms have been used for brevity, clarity and understanding. However, no unnecessary limitations are to be an implied therefrom because such terms are used for descriptive purposes and are intended to be broadly construed. Moreover the descriptions and illustrations herein are by way of examples, and the new and useful features and relationships are not limited solely to the features and relationships that have been shown and described.

Further it should be understood that the features and/or relationships associated with one arrangement described herein can be combined with the features and/or relationships from another arrangement. That is, various features and/or relationships from the various arrangements described herein can be combined in further arrangements. The new and useful scope of the disclosure is not limited solely to the arrangements that have been shown and described.

Having described features, discoveries and principles of the exemplary arrangements, the manner in which they are constructed, operated and carried out, and the advantages and useful results attained, the new and useful features, devices, elements, arrangements, parts, combinations, systems, equipment, operations, methods, processes and relationships are set forth in the appended claims.

We claim:
1. A method comprising:
   a) recording a hologram in a thresholded opto-magnetic medium, including
      a(i) producing a collimated recording beam with a pulsed laser,
      a(ii) selectively modulating intensity of the recording beam by passage through a modulator to produce a modulated recording beam,
      a(iii) spatially shaping the modulated recording beam by passage through a shaping element to produce a shaped modulated recording beam,
      a(iv) causing the shaped modulated recording beam to be convergent by passage through an aspheric lens to produce a convergent shaped modulated recording beam,
      a(v) deflecting bidirectionally with a Micro Electro-Mechanical Systems (MEMS) mirror that is in operative connection with the modulator, the convergent shaped modulated recording beam, wherein multiple disposed locations on a surface of the opto-magnetic medium are exposed to a constriction of the convergent shaped modulated recording beam, wherein the constriction of the convergent shaped modulated recording beam at the surface has an asymmetrical cross section, and causes a change in magnetization of magnetic domains of the medium where energy of the constriction exceeds a threshold of magnetization reaction of the magnetic domains,
b) subsequent to recording the hologram, reconstructing the hologram including:
b(i) illuminating the changed opto-magnetic medium of (a)(v) with a collimated laser beam,
b(ii) focusing with a lens, light from the illuminated opto-magnetic medium onto a detection matrix.

2. The method according to claim 1
wherein the shaping element comprises a diapositive plate,
wherein the diapositive plate includes symmetrically shaded areas and a central unidirectionally extending transparent strip,
wherein in (a)(iii) the modulated recording beam passes through the transparent strip.

3. The method according to claim 1
wherein the shaping element comprises a diapositive plate,
wherein the diapositive plate includes symmetrically shaded areas and a central unidirectionally extending transparent strip of constant width,
wherein in (a)(iii) the modulated recording beam passes through the transparent strip.

4. The method according to claim 1
wherein the shaping element comprises a diapositive plate,
wherein the diapositive plate includes symmetrically shaded areas and a central unidirectionally extending transparent strip,
wherein the transparent strip extends horizontally,
wherein in (a)(iii) the modulated recording beam passes through the transparent strip.

5. The method according to claim 1
wherein in (a)(ii) intensity of the recording beam is reduced by passage through the modulator.

6. The method according to claim 1
wherein the modulating of the intensity in (a)(ii) is coordinated with the deflecting in (a)(v).

7. The method according to claim 1
wherein the modulator is in operative connection with a computer,
wherein the MEMS mirror is in operative connection with the computer,
wherein the modulating of intensity in (a)(ii) is coordinated with the deflecting in (a)(v) responsive to operation of the computer.

8. The method according to claim 1
wherein in (b)(i) the collimated laser beam comprises a polarized beam.

9. The method according to claim 1, and further comprising:
prior to (b)(i)
producing the collimated laser beam, and passing the collimated laser beam through a polarizer.

10. The method according to claim 1, and further comprising:
prior to (b)(i)
producing the collimated laser beam, and passing the collimated laser beam through a polarizer, wherein the polarizer has a polarization axis, and
prior to (b)(ii)
passing light from the illuminated opto-magnetic medium through a further polarizer, wherein the further polarizer has a further polarization axis perpendicular to the polarization axis of the polarizer.

11. The method according to claim 1
wherein in (a)(i) the pulsed laser comprises a femtosecond laser.

12. The method according to claim 1
wherein in (b)(i) the collimated laser beam is comprised of visible light.

13. The method according to claim 1
wherein in (a)(v) the constriction has an elongated oval shape.

14. The method according to claim 1, wherein in (a) the medium comprises an opto-magnetic medium including a plurality of metallic films comprised of different composition materials and different concentration of components including:
at least one of GdFeCo, GdFe, GdCo, FeMnPt, Co/Pt, Co/Pd, Fe/Pt, Tb/Co, MnRuGa, HoFeCo, and TbCo.

15. The method according to claim 1, wherein in (a) the medium comprises an opto-magnetic medium including a plurality of metallic magnetic layers separated by non-magnetic spacer layers.

16. The method according to claim 1, wherein in (a) the medium comprises an opto-magnetic medium being supported on a substrate which is selected from a group comprising at least one of MgO, Si, GaAs, GaN, $SiO_2$, $Al_2O_3$ and glass.

17. The method according to claim 1 and further comprising: c) subsequent to at least a portion of (b), rewriting of the hologram by exposing the surface to a further beam from the pulsed laser of (a).

18. A method comprising:
a) recording a hologram in a thresholded opto-magnetic medium, including
a(i) producing with a pulsed laser, a collimated recording beam,
a(ii) passing the recording beam produced in (a)(i) through a modulator to selectively modulate intensity of the recording beam,
a(iii) passing the modulated recording beam of (a)(ii) through a shaping plate,
a(iv) passing the shaped modulated recording beam of (a)(iii) through a lens to cause the shaped modulated recording beam to be convergent,
deflecting the convergent shaped modulated recording beam of (a)(iv) with a Micro Electro-Mechanical Systems (MEMS) mirror that is in operative connection with the modulator, to cause a plurality of disposed locations on a surface of the opto-magnetic medium to be exposed to a constriction of the convergent shaped modulated recording beam, wherein the constriction to which the surface is exposed has an asymmetrical cross-section and exposure to the constriction causes a change in magnetization of magnetic domains of the medium where energy of the constriction exceeds a threshold.

19. The method according to claim 18, and further comprising:
subsequent to (a)(v)
(b) reconstructing the hologram, including:
(b)(i) illuminating the opto-magnetic medium that was changed in (a)(v), with a collimated laser beam,
(b)(ii) focusing with a lens onto a detection matrix, light from the illuminated opto-magnetic medium.

20. The method according to claim 18
subsequent to (a)(v)
(b) reconstructing the hologram, including
 (b)(i) producing a collimated laser beam,
 (b)(ii) passing the collimated laser beam of (b)(i) through a polarizer to produce a polarized collimated laser beam,
 (b)(iii) illuminating the opto-magnetic medium as changed in (a)(v), with the polarized collimated laser beam produced in (b)(ii),
 (b)(iv) focusing with a lens onto a detection matrix, light from the illuminated opto-magnetic medium.

21. The method according to claim 20
wherein in (b)(ii) the polarizer has a polarization axis, and further comprising:
subsequent to (b)(iii) and prior to (b)(iv)
passing light from the illuminated opto-magnetic medium through a further polarizer,
wherein the further polarizer has a further polarization axis, wherein the further polarization access is perpendicular to the polarization axis.

22. The method according to claim 21
wherein the shaping plate comprises a plate having symmetrically shaded areas and a central unidirectionally extending transparent strip,
wherein in (a)(iii) the modulated recording beam passes through the transparent strip.

23. The method according to claim 22
wherein in (a)(iii) the shaping plate comprises a diapositive plate, and the transparent strip is of constant width and extends horizontally.

24. The method according to claim 22
wherein the intensity modulation in (a)(ii) is coordinated with the deflecting in (a)(v).

* * * * *